(12) United States Patent
Mirowski et al.

(10) Patent No.: US 7,630,517 B2
(45) Date of Patent: Dec. 8, 2009

(54) COMPUTER-BASED GENERATION AND VALIDATION OF TRAINING IMAGES FOR MULTIPOINT GEOSTATISTICAL ANALYSIS

(75) Inventors: Piotr Mirowski, New York, NY (US);
Daniel Tetzlaff, Houston, TX (US);
David McCormick, Acton, MA (US);
Nneka Williams, Boston, MA (US);
Claude Signer, Somerville, MA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 717 days.

(21) Appl. No.: 11/180,191

(22) Filed: Jul. 13, 2005

(65) Prior Publication Data
US 2007/0014435 A1 Jan. 18, 2007

(51) Int. Cl.
G06K 9/00 (2006.01)
G06G 7/48 (2006.01)
G01V 1/40 (2006.01)
G01V 3/18 (2006.01)
G01V 5/04 (2006.01)
G01V 9/00 (2006.01)
G06F 17/18 (2006.01)
G06F 19/00 (2006.01)

(52) U.S. Cl. .......................... 382/109; 702/6; 702/179; 703/10

(58) Field of Classification Search ................ 382/109; 703/10; 702/6, 179
See application file for complete search history.

(56) References Cited

U.S. PATENT DOCUMENTS

| 6,035,255 | A | 3/2000 | Murphy et al. ................ 702/11 |
| 6,070,125 | A | 5/2000 | Murphy et al. ................ 702/11 |
| 2004/0210547 | A1* | 10/2004 | Wentland et al. .............. 706/46 |
| 2006/0041410 | A1* | 2/2006 | Strebelle ........................ 703/10 |
| 2006/0052938 | A1* | 3/2006 | Thorne et al. ................. 702/11 |
| 2006/0241920 | A1* | 10/2006 | Le Ravalec-Dupin et al. .. 703/2 |

FOREIGN PATENT DOCUMENTS

GB 2 408 363 A 5/2005

OTHER PUBLICATIONS

Bishop, C.M. *Neural Networks for Pattern Recognition*. Oxford: Oxford University Press (1995): 310-318.
Bradley et al. "Classification in Scale-Space: Applications to Texture Analysis." International Conference on Information Processing in Medical Imaging (1995).
Caers, J. "Geostatistical History Matching Under Training-Image Based Geological Model Constraints." SPE 77429, SPE Annual Technical Conference and Exhibition, San Antonio, TX, Sep. 29-Oct. 2.
Caers, J. "Efficient Gradual Deformation Using a Streamline-based Proxy Method", Journal of Petroleum Science and Engineering, Elsevier, Amsterdam, NL, vol. 39, No. ½, Aug. 2003, pp. 57-83, XP001197320.

(Continued)

*Primary Examiner*—John B Strege
(74) *Attorney, Agent, or Firm*—James McAleenan; Jody Lynn DeStefanis; Dale Gaudier

(57) ABSTRACT

A computer-implemented method is provided that automatically characterizes and verifies stationarity of a training image for use in multipoint geostatistical analysis. The stationarity is preferably characterized by statistical measures of orientation stationarity, scale stationarity, and category distribution stationarity.

24 Claims, 35 Drawing Sheets

OTHER PUBLICATIONS

Clausi, D. Fast Co-occurrence Probability Texture Feature Extraction, Vision and Image Processing (VIP) Research Group, Systems Design Engineering, University of Waterloo, CRYSYS Workshop, Mar. 2002. From: http://www.ccin.ca/CRYSYS/meetings/2002_meeting/clausi_session7_2.ppt accessed Jun. 8, 2007.

Damsleth et al. "A Two-Stage Stochastic Model Applied to a North Sea Reservoir." SPE 20605, 1992.

Deng et al. "Gaussian MRF Rotation-Invariant Features for Image Classification." IEEE Transactions on Pattern Analysis and Machine Intelligence, vol. 26, No. 7 (Jul. 2004): 951-955.

Deutsch, C.V. and Libing Wang. "Hierarchical Object-Based Stochastic Modeling of Fluvial Reservoirs." Mathematical Geology, vol. 28, No. 7 (1996): 857-880.

Feng, X. "Analysis and Approaches to Image Local Orientation Estimation." Dess. University of California Santa Cruz, Mar. 2003.

Guardiano F. et al. "Multivariate Geostatistics: Beyond Bivariate Moments." *Geostatistics-Troia '92*. Editor: A. Soares. Dordrecht, Netherlands, Kluwer Academic Publications. vol. 1: 133-144, 1992.

Hall et al. "Estimation of Critical Formation Evaluation Parameters Using Techniques of Neurocomputing." SPWLA 36$^{th}$ Annual Logging Symposium, Jun. 26-29, 1995: 1-12.

Haralick et al. "Textural Features for Image Classification." IEEE Transactions on Systems, Man, and Cybernetics, vol. SMC-3, No. 6 (Nov. 1973): 610-621.

Isaaks, E.H. And Srivastava, R.M. "An Introduction to Applied Geostatistics." *Applied Geostatistics*. New York: Oxford University Press (1989): 369-399.

Latecki et al. "Tree-structured Partitioning Based on Splitting Histograms of Distances." Proceedings of the Third IEEE International Conference on Data Mining (2003).

Latecki et al. "Shape Similarity Measure Based on Correspondence of Visual Parts." IEEE Transactions on Pattern Analysis and Machine Intelligence, vol. 22, No. 10 (Oct. 2000): 1185-1190.

Liu et al. "Multiple-point simulation integrating wells, three-dimensional seismic data, and geology." *AAPG Bulletin*, v. 88, No. 7 (Jul. 2004): 905-921.

Ma et al. "Texture Features and Learning Similarity." IEEE (1996): 425-430.

Manjunath et al. "Texture Features for Browsing and Retrieval of Image Data." IEEE Transactions on Pattern Analysis and Machine Intelligence, vol. 18, No. 8 (Aug. 1996): 837-842.

Mardia, K.V. *Statistics of Directional Data*. New York: Academic Press Inc., 1972: 57-69, 132-137, 152-155, 160-163, 256-259, 276-281, 300-301, 200-203, 314-315.

Materka et al. Texture Analysis Methods—A Review, Technical Unversity of Lodz, Institute of Electronics, COST B11 Report, Brussels, 1998.

Metzler et al. "Texture Classification of Graylevel Images by Multiscale Cross-Cooccurrence Matrices." *IEEE* (2002): 549-552.

Press et al. *Numerical Receipes in C: The Art of Scientific Computing*. 2$^{nd}$ Edition. Cambridge: Cambridge University Press (1992): 553-558.

Randen et al. "Filtering for Texture Classification: A Comparative Study." *IEEE Transactions on Pattern Analysis and Machine Intelligence*, vol. 21, No. 4 (Apr. 1999): 291-310.

Randen et al. "Three-Dimensional Texture Attributes for Seismic Data Analysis." *SEG 2000 Expanded Abstracts*.

Rao et al. "Computing Oriented Texture Fields." Computer Visualization Graphics and Image Processing: Graphical Models and Image Processing, vol. 53, No. 2 (Mar. 1991): 157-185.

Rock, N.M.S. Lecture Notes in Earth Sciences 18—Numerical Geology. New York: Springer Verlag (1988): 228-238.

Serra, J. Image Analysis and Mathematical Morphology. Orlando: Academic Press, Inc. (1982): 165-206.

Smith et al. "SUSAN—A New Approach to Low Level Image Processing." International Journal of Computer Vision 23(1) (1997): 45-78.

Strebelle, Sebastien. "Conditional Simulation of Complex Geological Structures Using Multiple-Point Statistics." *Mathematical Geology*, vol. 34, No. 1 (Jan. 2002): 1-21.

Strebelle et al. "Modeling of a Deepwater Turbidite Reservoir Conditional to Seismic Data Using Principal Component Analysis and Multiple-Point Geostatistics." *SPE Journal* (Sep. 2003): 227-235.

Visa, A. "Identification of Stochastic Textures with Multiresoluation Features and Self-organizing Maps." *IEEE* (1990): 518-522.

Wang, Libing. "Modeling Complex Reservoir Geometries with Multiple-Point Statistics." Mathematical Geology, vol. 28, No. 7 (1996): 895-907.

Yamada et al. "A volcanic reservoir: Facies distribution model accounting for pressure communication" SPE, Apr. 5, 2005-Apr. 7, 2005, pp. 1-9, XP002404104, Jakarta, IN, SPE 93159.

Zhang et al. "Content-based Image Retrieval Using Gabor Texture Features." Proceedings of the First IEEE Pacific-Rim Conference on Multimedia, Sydney, Dec. 2000.

Zhang et al. "Generic-Fourier Descriptor for Shape-based Image Retrieval." *IEEE* (2002): 425-428.

Patent Cooperation Treaty International Search Report and Written Opinion for International Application No. PCT/US2006/026514 dated Nov. 8, 2006.

Caers et al., "Multiple-point geostatistics: a quantitative vehicle for integrating geologic analogs into multiple reservoir models", Stanford University, Stanford Center for Reservoir Forecasting, Jan. 2, 2002, 24 pages.

Caers, "History Matching Under Training-Image-Based Geological Model Constraints", SPE Journal, Sep. 2003, pp. 218-226.

* cited by examiner

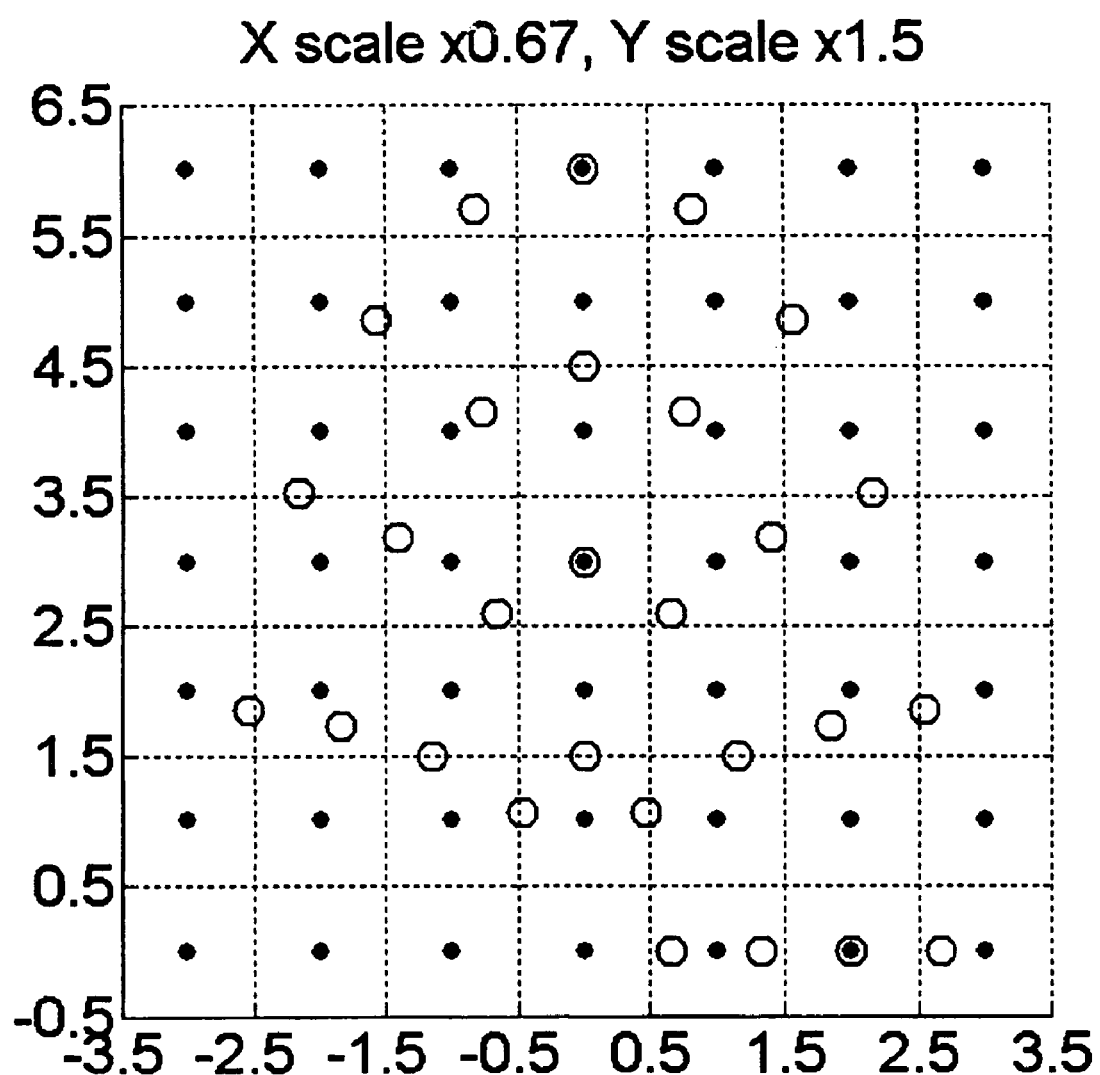

Retrieve training replicates of $\underline{d_n}$ $p(u;A \mid d_n) = \dfrac{1}{5}$ $\qquad\qquad$ $p(u;B \mid d_n) = \dfrac{4}{5}$ Feature Skin

COMPUTER-BASED GENERATION AND VALIDATION OF TRAINING IMAGES FOR MULTIPOINT GEOSTATISTICAL ANALYSIS

BACKGROUND OF THE INVENTION

1. Field of the Invention

This invention relates broadly to statistical analysis of random variables that simulate a property field. More particularly, this invention relates to multipoint geostatistical methods and simulations.

2. State of the Art

Geostatistics is a discipline concerned with spatially distributed random variables (also called "regionalized variables"), usually applied to problems in the earth sciences, such as estimation of mineral reserves and delineation of mineral deposits, hydrocarbon reservoirs, and aquifers. Multipoint (or multiple-point) geostatistics (MPGS) differs from the rest of geostatistics primarily in that it characterizes spatial variability using patterns (sets of points) that contain more than two points.

One of the goals of multipoint geostatistics is simulation, namely the generation of numerical values along a line, on a surface, or in a volume, such that the set of values honors certain given spatial correlation properties (usually derived from a data set called "analog" or "training image") while optionally (in the case called "conditional simulation") honoring predetermined data. In practice, the "analog" may be, for example, a well-known rock volume that is statistically similar to a yet poorly known oil reservoir being delineated, and the predetermined data to be honored may be lithology observations at wells, or probabilities of lithologies derived from seismic data. In this manner, MPGS simulations honor absolute or so-called "hard" constraints from data acquired in wells or outcrops, and conditional or "soft" constraints from seismic data, facies probability fields, and rotation and affinity (or scale) constraint grids. Such data are used in a stochastic modeling process to generate one-dimensional (1D), two-dimensional (2D) and/or three-dimensional (3D) maps of geological facies or rock properties. Since there is a random component involved in MPGS simulations, individual realizations of property fields created by MPGS algorithms differ, but the ensemble of realizations provide geoscientists and reservoir engineers with improved quantitative estimates of the spatial distribution and uncertainty of geological facies or rock properties in a modeled reservoir volume.

Multipoint geostatistical methods have been recently demonstrated to be computationally feasible and have been tested on real datasets as set forth in i) Strebelle, "Conditional Simulation of complex geological structures using multiple-point statistics," Mathematical Geology, v. 34, n. 1, 2002, pp. 1-22, ii) Strebelle et al., "Modeling of a deepwater turbidite reservoir conditional to seismic data using principal component analysis and multiple-point geostatistics," SPE Journal, Vol. 8, No. 3, 2003, pp. 227-235, and iii) Liu et al., "Multiple-point simulation integrating wells, three-dimensional seismic data, and geology," American Association of Petroleum Geologists Bulletin v.88, no. 7, 2004, pp. 905-921.

Traditional geostatistical methods rely upon a variogram to describe geologic continuity. However, a variogram, which is a two-point measure of spatial variability, cannot describe realistic, curvilinear or geometrically complex patterns. Multipoint geostatistical methods use a training image (instead of a variogram) to account for geological information. The training image provides a conceptual description of the subsurface geological heterogeneity, containing possibly complex multipoint patterns of geological heterogeneity. Multipoint statistics simulation anchors these patterns to well data (and/or outcrop data) and to the seismic-derived information (and/or probability field information or constraint grid(s)).

The training image often, but not necessarily, has a low-resolution (i.e. typically a few hundred pixels a side). Each pixel of the training image has a level (which can be a binary value, a grayscale value or a color value) associated therewith. The level at each pixel is referred to herein as a category. Typically, there are around 5 to 10 possible categories at each pixel of the training image, but this number could be greater or smaller. The shapes of geological element(s) defined by the training image represent a model of real geological elements, with each category typically representing a different geological facies or a different kind of geological body.

Geostatistics relies on the well-known concept of random variables. In simple terms, reservoir properties at various grid locations are largely unknown or uncertain; hence each property of interest at each grid location is turned into a random variable whose variability is described by a probability function. In order to perform any type of geostatistical simulation, one requires a decision or assumption of stationarity. In multipoint geostatistical methods, the use of training images is bound by the principle of stationarity as described by Caers et al., "Multiple-point geostatistics: a quantitative vehicle for integrating geologic analogs into multiple reservoir models," AAPG Memoir, Integration of Outcrop and Modern Analogs in Reservoir Modeling, (eds.) Grammer, G. M, 2002. In the case of 2D or 3D reservoir modeling, a random variable or random process is said to be stationary if all of its statistical parameters are independent of its location in space (invariant according to any translation). In the case of training images, this stationarity can consist, but is not limited to, orientation stationarity, where directional elements do not rotate across the training image; and scale stationarity (where the size of elements on the image does not change across the training image).

Although the concept of stationarity is referred to in Caers et al. paper entitled "Multiple-point geostatistics: a quantitative vehicle for integrating geologic analogs into multiple reservoir models," this paper fails to disclose a methodology for automatically estimating and validating the stationarity of a given training image to ensure that that training image is appropriate for multipoint geostatistical methods.

SUMMARY OF THE INVENTION

It is therefore an object of the invention to provide a methodology for automatically estimating and validating the stationarity of a given training image to ensure that the training image is appropriate for multipoint geostatistical methods.

It is another object of the invention to provide data structures that characterize properties of a training image, which can be used in multipoint geostatistical methods.

In accord with these objects, which will be discussed in detail below, a computer-implemented method is provided that automatically characterizes and verifies stationarity of a training image for use in multipoint geostatistical analysis. The stationarity of the training image is preferably characterized by statistical measures of orientation stationarity, scale stationarity, and category distribution stationarity.

It will be appreciated that the computer-implemented methods of the present invention provide an automatic and accurate determination of whether or not a candidate training image is stationary and thus is suitable for MPGS realizations requiring such stationary training images. By consequence, geologists employing the computer-implemented methods of the present invention save time and avoid running unnecessary MPGS realizations using unsuitable training images.

According to the preferred embodiment of the invention, the statistical measures that characterize the orientation stationarity of the training image include at least one of the following: (i) a first set of statistics that characterizes nonuniformity of the orientation field and thus provide an indication that there is one or several preferential directions in the orientation grid, (ii) a second set of statistics that characterizes the normality of the distribution of directions in the orientation grid and thus provides an indication that there is a dominant direction in the orientation field, and (iii) a third set of statistics that characterizes the repeatability of the orientation field, which provides an indication that the orientation field is similar across different zones of the image. The statistical measures that characterize the scale stationarity of the training image preferably include distances between a first set of feature vectors and a second set of feature vectors. The first set of feature vectors is derived from a first set of displacement images that are generated by subjecting the image to a plurality of rotation-dependent sampling operations. The second set of feature vectors is derived from a second set of displacement images that are generated by subjecting a reference pattern selected from the image to a plurality of rotation-and-scale-dependent sampling operations.

Additional objects and advantages of the invention will become apparent to those skilled in the art upon reference to the detailed description taken in conjunction with the provided Figures.

BRIEF DESCRIPTION OF THE DRAWINGS

FIG. 3(A) is the training image; FIG. 3(B) is an image illustrating the Y-component of the 2D gradient field that is generated by applying the Prewitt filter $G_y$ over the training image category of FIG. 3(A); FIG. 3(C) is an image illustrating the X-component of the 2D gradient field that is generated by applying the Prewitt filter $G_x$ over the representative training image category of FIG. 3(A); and FIG. 3(D) is an image showing the orientation field of the training image category of FIG. 3(A).

DETAILED DESCRIPTION OF THE PREFERRED EMBODIMENT

Figure 1A:
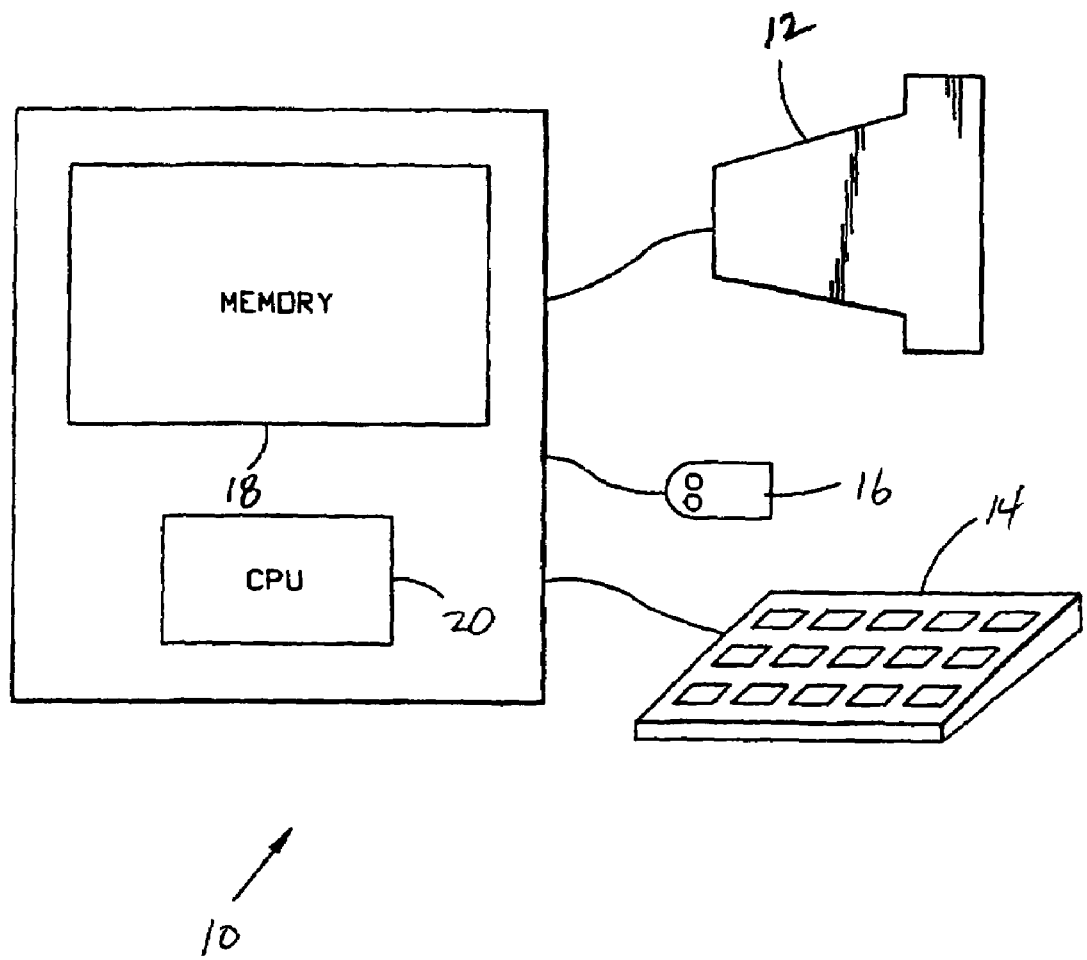
FIG. 1(A) is a block diagram of a computer processing system that embodies the methodology of the present invention.

FIG. 1(A) is a functional block diagram of a general purpose computer system 100 that embodies the present invention. The computer system 10 may include a work station (or high performance personal computer) that performs the relevant computations and decision logic as discussed below, e.g., training image processing, training image stationarity statistics generation and evaluation, and multi-point statistical analysis based thereon. For example, the computer system 10 may include a display device 12 and user input devices such as a keyboard 14 and mouse 16. The computer system 10 also includes memory 18 (e.g., persistent memory such as a magnetic hard disk drive as well as non-persistent memory such as one or more DRAM modules) that stores software application(s) that are executed on a processor 20 to perform the relevant computations and decision logic as discussed below, e.g., training image processing, training image stationarity statistics generation and evaluation, and multi-point statistical analysis based thereon. Such software applications, which comprise a programmed sequence of instructions and data, are typically stored on one or more optical disks that are loaded into the memory 18 by an optical disk drive (not shown) for persistent storage therein. Alternatively, such software applications can be loaded into the memory 18 over a network connection (e.g., an Internet connection) or other suitable means for persistent storage therein. In the description below, the "image" refers indistinctly to either a line or a surface or a volume, and consists of a contiguous array of equal pixels, each of which may contain a value (or number).

Figure 1B:
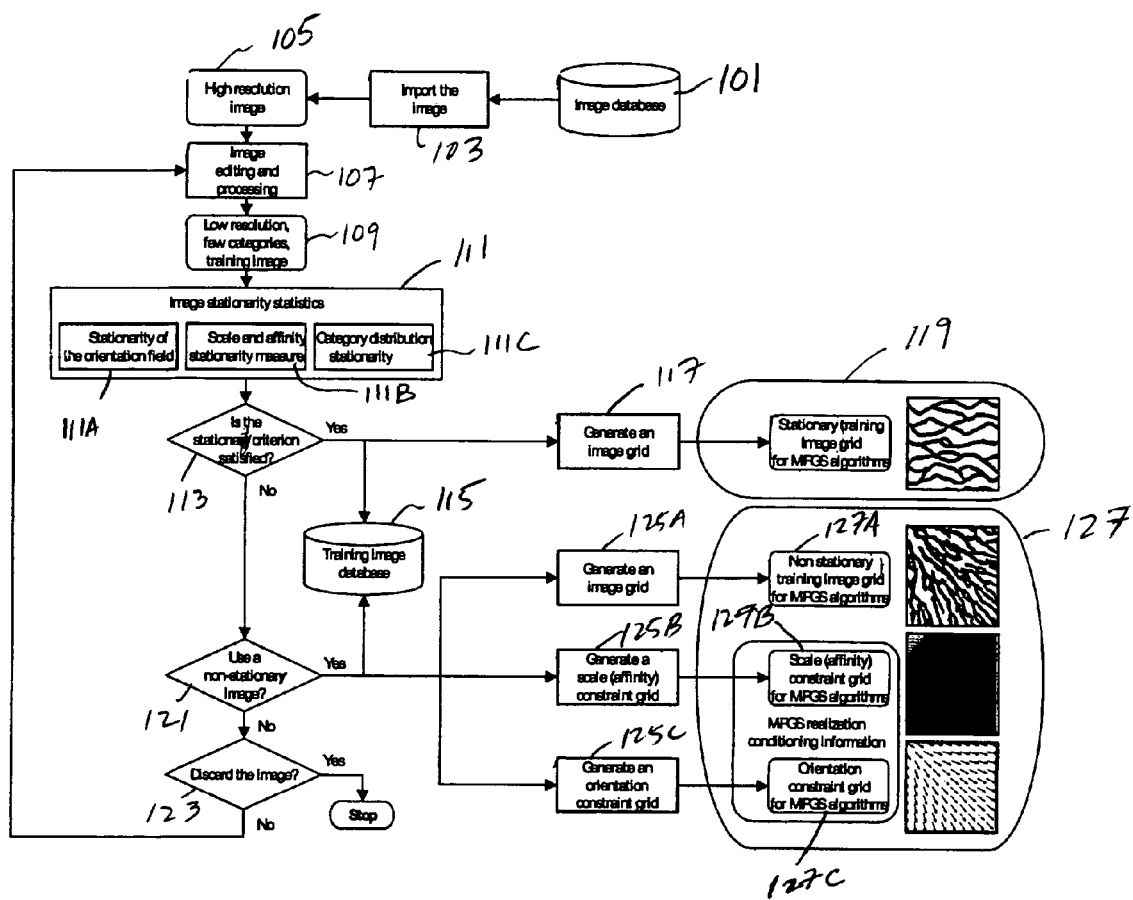
FIG. 1(B) is a flow chart illustrating the workflow of the computer-based methodology for the automatic generation and verification of training images and subsequent multipoint geostatistical analysis based thereon in accordance with the present invention.

FIG. 1(B) illustrates a workflow that embodies a computer-based methodology for the automatic generation and the validation of training images and multipoint geostatistical simulations based thereon in accordance with the present invention. Candidate images that are used for the generation of training images are stored in an image database 101, which can be realized by any kind of electronic, optical, or magnetic storage. In block 103, a candidate image is imported from the image database 101. At this point, the candidate image can be any kind of black and white, grayscale, color, or multispectral image, and can be of any definition (resolution). For simplicity of description, the candidate image is referred to as a "high-resolution" image in block 105.

In block 107, the candidate image of block 105 is processed to adjust the number of categories of the pixels of the image if desired and to adjust its resolution if desired. Typical multi-point geostatistical methods require a training image with a small number of categories, for instance less than 11. Often, the dimensions of the training image must be a few hundred pixels a side. The task of reducing the number of grayscale/color levels of the candidate image while keeping geological significance of the assigned categories of the candidate image is of variable difficulty and depends upon the complexity and quality of the candidate image, including the presence of noise and illumination effects. The list of image processing operations that can be used as part of this step includes, but is not limited to, mathematical morphology operations on images, color or gray-level histogram thresholding or clustering, low-pass or high-pass image filtering. Often, the desired result can be achieved only through a combination of successive image processing operations on the original image. A graphical user interface may be provided that enables a user to interconnect such blocks, visualize such interconnections by a graph, and then save the interconnected image processing workflow for subsequent use. The resultant image generated by the image processing workflow of block 107 is referred to as a "low resolution, few category" training image in block 109. The dimensions and categories of the training image of block 109 match the dimensions and categories required for subsequent multipoint geostatistical methods (block 119).

Figure 2A:
FIGS. 2(A)-2(E) are a sequence of images that illustrate the image processing operations performed on a candidate image as part of the workflow of FIG. 1(B); in this example, the candidate image is an aerial color photograph of a river delta.
Figure 2B:
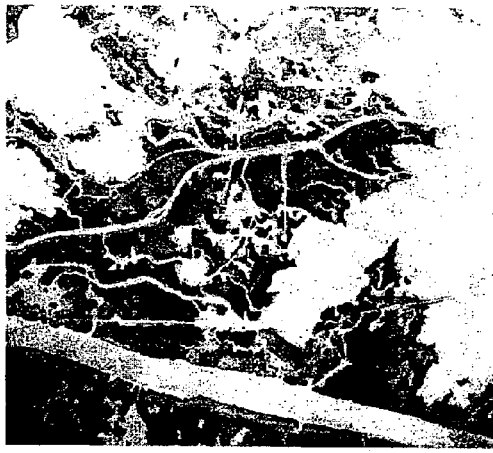
Figure 2C:
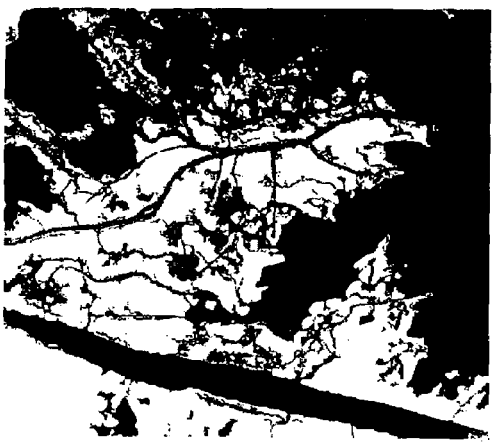
Figure 2D:
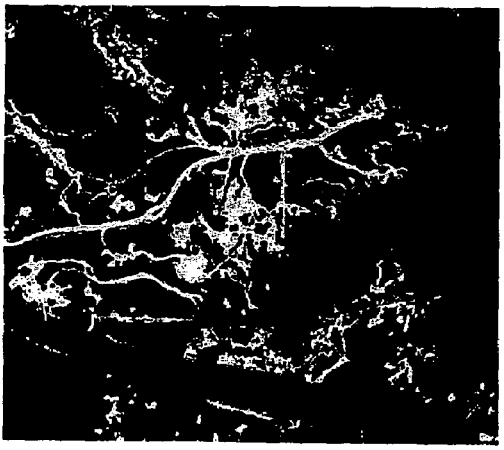
Figure 2E:
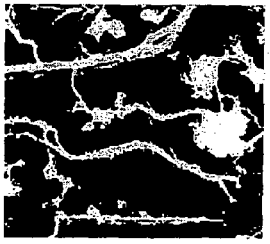

FIGS. 2(A)-2(E) illustrate an example of the image processing workflow of block 107 on a candidate image that is an aerial color photograph of a river delta. FIG. 2(A) is the grayscale copy of the aerial color photograph. FIG. 2(B) is the result of the removal of the illumination effect on the image of FIG. 2(A) by the application of a morphological operation. FIG. 2(C) is the result of a color segmentation of the image of FIG. 2(B) and of the removal of large connected areas (here the river and the sea) by a flood-fill technique. In FIG. 2(D), only the grayscale level corresponding to rivers has been retained, and the two other grayscale levels are merged together. FIG. 2(E) is a cropped highlight of the image of FIG. 2(D) and shows the river channel pattern that is retained for the purpose of a candidate training image for multi-point geostatistical methods. This pattern has 2 categories, the river and the background.

In block 111, the stationarity of the training image of block 109 is estimated. Such operations derive stationarity statistics which characterize the stationarity of the training image. Preferably, such statistics characterize the stationarity of the orientation field (block 111A), the stationarity of the image scale (block 111B) and the stationarity of the distribution of categories (block 111C) for the training image of block 109.

In block 113, the stationarity statistics derived in block 111 are analyzed to determine if the training image of block 109 satisfies a set of predetermined constraints which dictate whether or not the training image should be used in subsequent multi-point geostatistical analysis (e.g., block 119). If the stationarity statistics satisfy such predetermined constraints, the training image is added to a training image database 115, which can be realized by any kind of electronic, optical, or magnetic storage. This training image can be accessed from the database 115 (or output directly from block 113) for use in a multi-point geostatistical analysis (block 119). Such operations may involve formatting the training image as a training image grid (block 117) in accordance with the format required by the multi-point geostatistical analysis (block 119).

If it is determined in block 113 that the stationarity statistics do not satisfy the predetermined constraints, the user selects whether or not the non-stationary training image should be added to the training image database 115 (block 121) or discarded (block 123). The non-stationary training image can be accessed from the database 115 (or output directly from block 121) for use in multi-point geostatistical analysis (block 127). Such operations may utilize the non-stationary training image as the basis for a non-stationary training image grid (blocks 125A, 127A), a scale constraint grid (blocks 125B, 127B), or an orientation constraint grid (blocks 125C, 127C).

For non-stationary images (e.g., those not discarded in block 123), the operations can recursively jump back to block 107 wherein different image processing techniques can be applied to extract other features from the candidate image of block 105 in order to produce a training image that meets the stationarity criteria (blocks 109-113).

Figure 4:
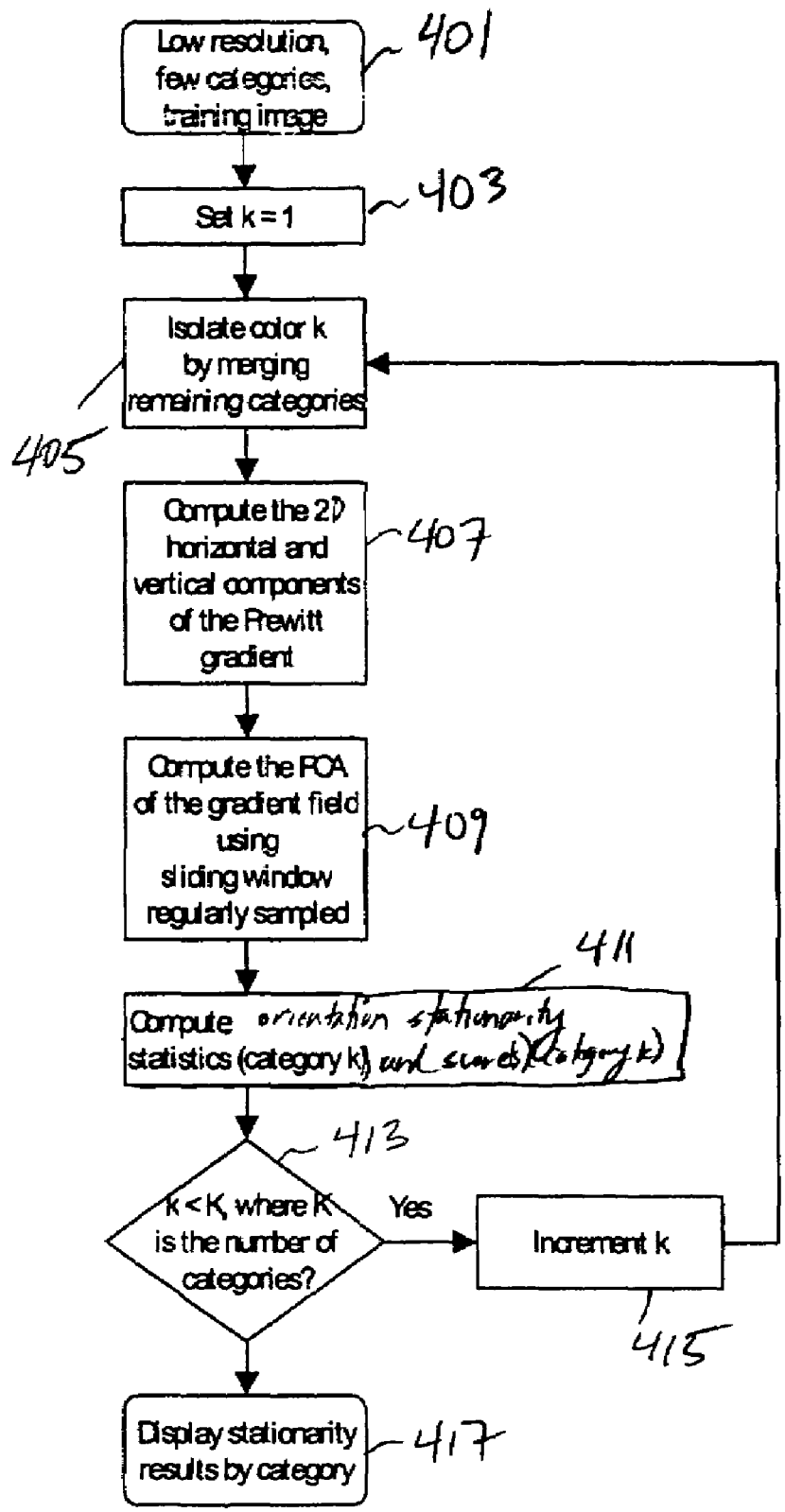
FIG. 4 is a flowchart illustrating operations that generate orientation stationarity statistics and a score based thereon as part of the workflow of FIG. 1(B).

FIG. 4 illustrates the operations of block 111A that characterize the stationarity of the orientation field of the training image of block 109. It is assumed that for each training image, the categories of the training image correspond to different geological elements. In order to separate the orientation stationarity statistics by category and by kind of geological element, each category is isolated and the orientation field and statistics derived therefrom are derived for the particular category. In order to isolate a particular category, pixels that are from any other category are all assigned to the same background category. Stationarity statistics by category can then be averaged or weighted according to the significance that the user wants to attribute to them.

The operations on the training image (labeled block 401) begin by initializing a counter (variable "k") to 1 (block 403) and then transforming a copy of the training image such that the category corresponding to the counter k (i.e., the $k^{th}$ category) is isolated from the other categories (block 405). This image is referred to as a "training image category" below.

In blocks 407 and 409, the orientation field for the training image category is derived. In the preferred embodiment, the orientation field is calculated by first computing the gradient field of the training image category using a 2D convolution, such as the "vertical" and "horizontal" Prewitt filters, and then extracting the first principal component of the gradient field over a sliding window of fixed size (which is referred to as the "kernel") using principal component analysis. Such analysis is described in detail in Feng X., "Analysis and Approaches to Image Local Orientation Estimation," thesis submitted for an MSc in Computer Engineering at University of California at Santa Cruz, 2003, and in Randen et al., "Three-Dimensional Texture Attributes for Seismic Data Analysis," Schlumberger Stavanger Research, SEG 2000 Expanded Abstracts, 2000, herein incorporated by reference in their entireties. The "vertical" Prewitt filter $$G_y = \begin{bmatrix} 1 & 1 & 1 \\ 0 & 0 & 0 \\ -1 & -1 & -1 \end{bmatrix}$$

emphasizes "horizontal" edges (i.e., edges along the X direction). The "horizontal" Prewitt filter $$G_x = \begin{bmatrix} 1 & 0 & -1 \\ 1 & 0 & -1 \\ 1 & 0 & -1 \end{bmatrix}$$

emphasizes "vertical" edges (i.e., edges along the Y direction).

The gradient field is comprised of a 2D vector for each pixel of the training image category. Using principal component analysis, the first principal component of the gradient field is extracted over a circular mask scanned over the image. This is similar to computing the eigenvectors and eigenvalues of the matrix $$T = \frac{1}{n}\sum_{i=1}^{n} x_i x_i^T.$$

The circular mask is obtained from a square window (kernel) of fixed size N where the pixels are given a weight W (x,y) like in the 2D Gaussian window W (x,y) where $$W(x, y) = e^{-\frac{1}{2}\left[\left(\frac{x-\frac{N}{2}}{\frac{N}{2}}\right)^2 + \left(\frac{y-\frac{N}{2}}{\frac{N}{2}}\right)^2\right]},$$

where $$0 \leq x < N$$

and $$0 \leq y < N$$

The principal component analysis generates two attributes: (i) the unit principal vector V/|V| (either as a value in radians or as x and y components); and (ii) its associated principal value $s_1$, which is also the principal vector modulus and which highlights strong isotropic trends. It must be noted that since the gradient vectors are orthogonal to the desired image orientation, the principal direction must be rotated by π/2 radians. The orientation field is defined by the unit principal vector and its associated principal value (or magnitude) at fixed intervals, with typical values of 64 pixels for the size of the kernel or mask, and 16 pixels for the spacing of two consecutive samples. The orientation field can be represented either by the angle and the magnitude of the principal unit vectors (where all the angles are computed modulo 180 degrees) or the X and Y components of the unit principal unit vectors and associated principal values.

Figure 3A:
FIGS. 3(A)-3(D) are a sequence of images that illustrate the image processing operations that extract an orientation field for a training image category as part of the workflow of FIG. 1(B)
Figure 3B:
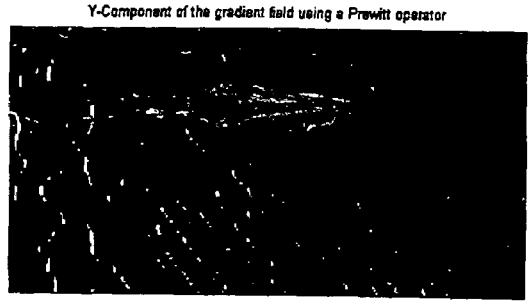
Figure 3C:
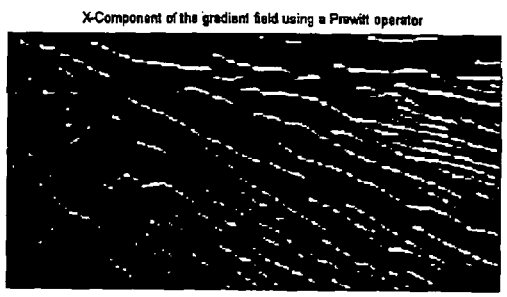
Figure 3D:

FIGS. 3(A)-3(D) are a sequence of images that illustrate the image processing operations that extract an orientation field for a training image category as part of the workflow of FIG. 1(B). FIG. 3(A) is an exemplary training image category. FIG. 3(B) is an image illustrating the Y-component of the 2D gradient field that is generated by applying the Prewitt filter $G_y$ over the training image category of FIG. 3(A). FIG. 3(C) is an image illustrating the X-component of the 2D gradient field that is generated by applying the Prewitt filter $G_x$ over the training image category of FIG. 3(A). The principal component of the orientation vectors can be computed in sliding overlapping regularly-sampled windows (also called the orientation kernel). FIG. 3(D) is an image showing the orientation field, where the orientation kernel is of size 64×64 pixels and is sampled every 16 pixels.

Returning to FIG. 4, in block 411, the orientation field generated in block 409 is used to derive statistics that characterize the axial orientation of the training image category and one or more scores associated therewith. Preferably, such statistics are distribution parameters that estimate the Von-Mises distribution of the orientation field and the score(s) associated therewith that characterize one or more of the following: (i) the uniformity/nonuniformity of circular data distribution of the orientation field, which provides an indication that there is one or several preferential directions on the image, (ii) normality of circular data distribution of the training image category, which provided an indication that there is a dominant direction of the orientation field and (iii) repeatability of the orientation field, which provides an indication that the orientation field is similar across different zones on the image.

In block 413, it is determined whether the counter "k" corresponds to the last category (K) of the training image. If not, the counter "k" is incremented by one (i.e., k=k+1) in block 415 and the operations return to block 405 to isolate the next category of the training image and compute the orientation stationarity statistics for the next category (blocks 407-411). When the last category has been processed (k=K in block 413), the operations continue to block 417 to display the results of the orientation stationarity processing of blocks 407-411 for each category of the training image. Stationarity statistics by category can then be averaged or weighted according to the significance that the user wants to attribute to them for subsequent processing and decision making.

Figure 5A:
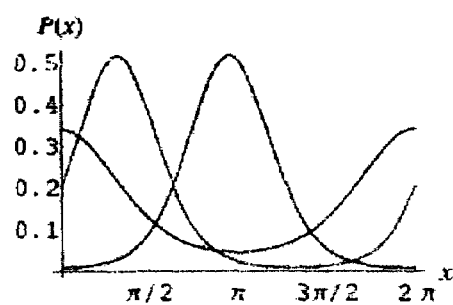
FIGS. 5(A) and 5(B) are graphs that illustrate the probability density function of a Von Mises distribution.
Figure 5B:
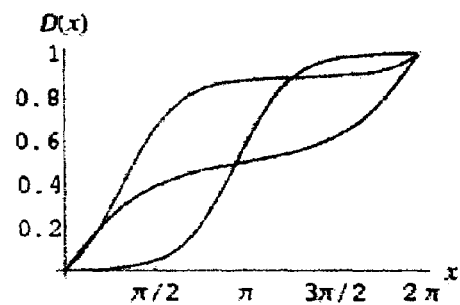
Figure 6A:
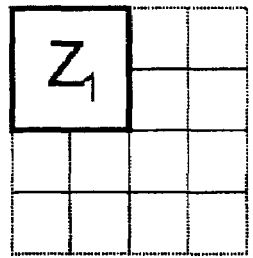
FIGS. 6(A)-6(I) are diagrams that illustrate the partitioning of a training image category into overlapping zones; these overlapping zones are used in computing orientation stationarity statistics (and a score based thereon), scale stationarity statistics (and a score based thereon) and category distribution stationarity statistics (and a score based thereon) as part of the workflow of FIG. 1(B).
Figure 6B:
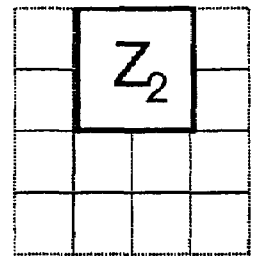
Figure 6C:
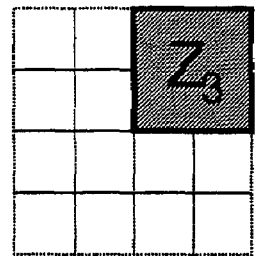
Figure 6D:
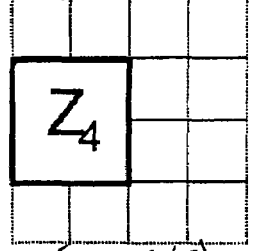
Figure 6E:
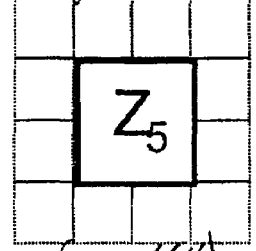
Figure 6F:
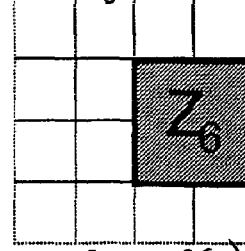
Figure 6G:
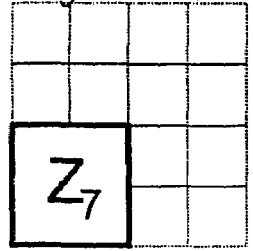
Figure 6H:
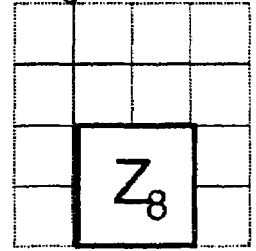
Figure 6I:
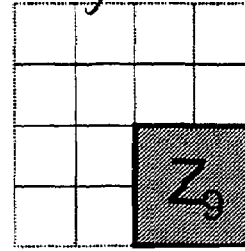

In the preferred embodiment, it is assumed that the orientation field follows a circular normal distribution. In this case, the angles of the orientation vectors modulo 180 degrees are important, and the magnitudes of such vectors are irrelevant. Thus, the distribution must have an axial symmetry. The hypothesis of normality is of course restrictive but can be justified by the fact that the orientation field is computed with large kernels. This provides an hypothesis of a 2-wrapped Von Mises distribution, which is described in more detail in Mardia, "Statistics of Directional Data", Academic Press, New York, 1972, pp. 57-69, herein incorporated by reference in its entirety. The Von Mises distribution is controlled by two parameters, the scale parameter κ and the location parameter μ, and it follows the probability density function (PDF)

$$f(\theta, \mu, \kappa) = \frac{1}{2\pi I_o(\kappa)} e^{\kappa \cos(2(\theta - \mu))}$$

as shown in FIGS. 5(A) and 5(B). The variable κ is the concentration (an inverse measure of the "spread" of the orientation angle θ) and the variable μ is their mean direction. The function $I_o(\kappa)$ is the zero-order Bessel function defined by $$I_o(\kappa) = \frac{1}{2\pi} \int_0^{2\pi} e^{\kappa \cos\theta} d\theta.$$

The Von Mises distribution is by nature unimodal, unless the concentration κ equals 0 when it becomes uniform. All the statistics and tests relative to the Von Mises distribution can be obtained by multiplying the angles by 2. The simple Von Mises distribution follows the probability density function $$f(\theta, \mu, \kappa) = \frac{1}{2\pi I_o(\kappa)} e^{\kappa \cos(\theta - \mu)}.$$

Under the assumption of a unimodal normally distributed orientation field, the following formulas are preferably used to obtain an estimate $\tilde{\mu}$ of the circular mean μ:

$$C = \frac{1}{n} \sum_{i=1}^{n} \cos(2\theta_i)$$

$$S = \frac{1}{n} \sum_{i=1}^{n} \sin(2\theta_i)$$

$$\overline{R} = \sqrt{C^2 + S^2}$$

$$\tilde{\mu} = \text{sign}(S) \times \frac{\cos^{-1}\left(\frac{R}{C}\right)}{2}$$

Here C and S are the direction cosines and sines, and $\overline{R}$ is defined as the mean resultant length and is directly related to the concentration κ. These equations are described in detail in Rock, "Lecture Notes in Earth Sciences 18—Numerical Geology," Springer Verlag, 1988, herein incorporated by reference in its entirety. Note that the angles are doubled beforehand, and thus must be divided by two at the end. An estimate $\tilde{\kappa}$ can be derived from the maximum likelihood estimation. Alternatively, the estimate $\tilde{\kappa}$ can be derived using the following approximation $$\tilde{\kappa} = \begin{cases} \frac{R}{6}(12 + 6R^2 + 5R^4) & \text{if } R < 0.65 \\ \frac{1}{2(1-R) - (1-R)^2 - (1-R)^3} & \text{if } R \geq 0.65 \end{cases}$$

Estimation of the orientation stationarity of the training image category requires analysis that determines whether the distribution of the orientation field vectors is self-similar in different regions of the training image category. For this reason, nonuniformity and normality tests are done on the whole image and on each one of a plurality of overlapping zones. In the example shown in FIGS. 6(A)-6(I), the training image category is partitioned into 9 overlapping zones, which are labeled Z1, Z2, ... Z9. In this configuration, there are 1+9=10 different tests. In order to test an image for orientation stationarity, three (3) factors are empirically defined: (i) the nonuniformity of the orientation field, which provides an indication that there is one or several preferential directions in the orientation field, (ii) the normality of the distribution of directions in the orientation field, which provides an indication that there is a dominant direction in the orientation field, and (iii) the repeatability of the orientation field, which provides an indication that the orientation field is similar across different zones of the image. The repeatability test consists of comparing the orientation statistics taken over all the couples of zones. Using the 9 zones shown in FIGS. 6(A)-6(I), there are $C_9^2 = 36$ combinations of those couples.

The nonuniformity of the circular data distribution of the orientation field is estimated with a Rayleigh test based on the value of the mean resultant length $\overline{R}$ described above with two hypotheses as follows: (i) $H_{40}$: null hypothesis of uniformity, i.e. the orientation field does not have a preferential direction and could have been drawn from a random distribution; and (ii) $H_{41}$: nonuniformity of the circular data distribution of the orientation field. For small values of N≦100, the test is simply $\overline{R} > K$, and the critical values for $Pr(\overline{R} \leq \overline{R_0}) = \alpha$ with the following levels of confidence $\alpha \in \{1\%, 5\%, 2.5\%, 1\%, 0.1\%\}$ are table based and preferably derived from the table on page 300 of Mardia, "Statistics of Directional Data", Academic Press, New York, 1972. For N>100, the test is based on: $2N\overline{R}^2 > K$, where $2N\overline{R}^2$ is distributed as $\chi_2^2$. The critical values for $\alpha \in \{10\%, 5\%, 2.5\%, 1\%, 0.1\%\}$ are $\chi_2^2 \in \{4.605, 5.991, 7.378, 9.21, 13.816\}$. As a result of this test, the value of the confidence level α that yields the critical value closest to the tested value is returned. The percentage of certainty for non-uniformity is then given as 1−α. All the 9 zones and the whole orientation field are tested for uniformity. The final score for the nonuniformity for the whole image at a given scale (or size of the orientation kernel) is $$\text{nonuniformity} = \frac{(1-\alpha_{image}) + \sum_{k=1}^{9}(1-\alpha_{Z_k})}{10}.$$

The major limitation of this Rayleigh test is its hypothesis of normality of the circular distribution that allows the computation of $\overline{R}$, which is the mean resultant length on which the test statistic is based. Hence, if the distribution has, for example, two obvious modes that are 40-60 degrees apart, the test might give a high probability of nonuniformity because of a relatively high value of $\overline{R}$. Consequently, this test cannot be considered as a test assessing the hypothesis of uniformity vs. unimodality. A preferred approach is to set the nonuniformity score of a given zone to 0 if the test cannot be done because of lack of normality of the distribution on that zone.

The normality of the circular data distribution of the orientation field is estimated with a goodness of fit test that determines whether the assumption of a Von Mises distribution is correct, and thus confirms a normal distribution that has a preferential direction (theoretically unimodal according to its PDF) or which can become uniform for an extreme value of $\overline{R}=0$. The test has two hypotheses: (i) $H_{B0}$: null hypothesis of goodness of fit with the 2-wrapped Von Mises distribution (i.e., normality of the distribution); and (ii) $H_{B1}$: not a Von Mises distribution (i.e., not a normal distribution). A classical goodness-of-fit Chi-Square test can be used by comparing the circular histogram $\{O_i\}_{i \in [1,18]}$, of the measured orientation field with the theoretical histogram $\{E_i\}_{i \in [1,18]}$ that would be given by a 2-wrapped Von-Mises distribution with the same estimated mean direction $\tilde{\mu}$ and the concentration parameter $\tilde{\kappa}$ and computed over the same bins $\theta_{i \in [1,18]}$. The measured axial data are between [−90, 90 deg] and are binned into 18 bins $\{O_i\}_{i \in [1,18]}$ of width 10 deg that have the following bin centers:

$$\theta_{i \in [1,18]} = \{-85, -75, -65, -55, -45, -35,$$
$$-25, -15, -5, 5, 15, 25, 35, 45, 55, 65, 75, 85\}$$

$$\forall i \in [1, 18], E_i = f(\theta_i, \tilde{\mu}, \tilde{\kappa}) = \frac{1}{2\pi I_o(\tilde{\kappa})} e^{\tilde{\kappa}\cos 2(\theta - \tilde{\mu})}$$

The test criterion is $\chi^2 > \chi^2_{\alpha,\nu}$ where $$\chi^2 = \sum_{i=1}^{18} \frac{(O_i - E_i)^2}{E_i}.$$

For the Chi-Square test, $\nu=18-2-1=15$ degrees of liberty is used (we are comparing 18-bins histograms and the Von Mises distribution has 2 parameters, the location and the scale). The critical values for $\alpha \in \{99.5\%, 99\%, 97.5\%, 95\%, 90\%, 75\%, 50\%, 25\%,$
$10\%, 5\%, 2.5\%, 1\%, 0.5\%\}$ are $\chi^2_{15} \in \{4.60, 5.23, 6.26, 7.26, 8.55, 11.04, 14.34,$
$18.25, 22.31, 25.00, 27.49, 30.58, 32.80\}$ As a result of the test, the value of the confidence level $\alpha$ that yields the critical value closest to the tested value is returned.

All the 9 zones and the whole orientation field are tested for normality. The final score for the normality for the whole image at a given scale (or size of the orientation kernel) is $$\text{normality} = \frac{\alpha_{image} + \sum_{k=1}^{9} \alpha_{Z_k}}{10}.$$

The Chi-Square goodness-of-fit test has limitations due to the binning of circular data into a histogram, limitations that become more apparent when the value of the estimated concentration becomes very high. In that case, the test might give a very low or null confidence level for the normality test whereas the data are obviously unimodal. Consequently, two conditions can be set that automatically yield a confidence level $\alpha=100\%$: e.g., (i) $\tilde{\kappa}>20$; and (ii) card $(\{O_i\}_{i \in [1,18]}>0)<3$. Correction of a numerical artifact due to the binning is also provided—that is that for a given bin i, a very small value of the estimated observation $0<E_i<<1$ and a real observation $O_i=1$ (with the total number of observations being relatively high) will contribute a large number to the $\chi^2$ test statistic, therefore making the test fail. Since inadequate binning mostly contributes to this result, the contribution of this particular real observation to the $\chi^2$ test statistic can be set to zero.

The repeatability of the distribution of the orientation field is estimated with a two part test. The first test is a non-parametric test that compares two distributions taken from two zones of the image. The test employs two hypotheses: (i) $H_{C0}$: null hypothesis of having the two samples from the same population (distribution); and (ii) $H_{C1}$: the two samples are not from the same distribution. Here, the two samples that contain respectively $n_1$ and $n_2$ observations, where $N=n_1+n_2$. Both samples are combined and then ordered. The sets $\{a_i\}_{i \in [1,N]}$ and $\{b_j\}_{j \in [1,N]}$ are defined as follows. The set $\{a_i\}_{i \in [1,N]}$ is comprised of the numbers of observations from the first sample among the first i order statistics of the combined sample. The set $\{b_j\}_{j \in [1,N]}$ is comprised of the numbers of observations from the second sample among the first j order statistics of the combined sample. A $U^2$ value is calculated as follows $$U^2_{n_1,n_2} = \frac{n_1 n_2}{N^2} \sum_{k=1}^{N} (d_k - \bar{d})^2$$

$$d_k = \frac{b_k}{n_2} - \frac{a_k}{n_1}$$

$$\bar{d} = \frac{1}{N} \sum_{k=1}^{N} d_k$$

The critical values of $U^2_{n_1,n_2}$ for levels of confidence of $\alpha \in \{10\%, 5\%, 1\%, 0.1\%\}$ are given on page 314 of Mardia, "Statistics of Directional Data", Academic Press, New York, 1972. Details of this two-sample Watson $U^2$ test is described in Mardia, "Statistics of Directional Data", Academic Press, New York, 1972, pp. 201-203, herein incorporated by reference in its entirety.

The two-sample $U^2$ test often fails when the spread of directions is very narrow, probably because the directions are not regularly interleaved. As an alternative that also is sensitive to very narrow distributions of angles $\{\theta_i\}_{i \in [1,n_1]}$ and $\{\theta_j\}_{j \in [1,n_2]}$, the following test can be used:

if $\left(\left[\text{range}(\{\theta_i\}_{i\in[1,n_1]})<40°\right] \text{ and } \left[\text{range}(\{\theta_j\}_{j\in[1,n_2]})<40°\right]\right)$ $$\alpha = \begin{cases} 0 \text{ if } \left(\left[\min(\{\theta_i\}_{i\in[1,n_1]})\min(\{\theta_j\}_{j\in[1,n_2]})\right] \text{ and } \left[\max(\{\theta_i\}_{i\in[1,n_1]})<\min(\{\theta_j\}_{j\in[1,n_2]})\right]\right) \\ 0 \text{ if } \left(\left[\min(\{\theta_j\}_{j\in[1,n_2]})\min(\{\theta_i\}_{i\in[1,n_1]})\right] \text{ and } \left[\max(\{\theta_j\}_{j\in[1,n_2]})<\min(\{\theta_i\}_{i\in[1,n_1]})\right]\right) \\ 1 \text{ otherwise} \end{cases}$$

else execute the Watson's $U^2$ non – parametric test endif

Once the test is executed for all the $C_9^2=36$ possible pairs of zones, the first part of the repeatability score is computed as follows:

$$repeatability_1 = \frac{\sum_{i\in[1,9]}\sum_{j\in[1,9],i\neq j}\alpha_{z_i,z_j}}{C_9^2}$$

The second test that estimates the repeatability of the distribution of the orientation field is a parametric test that compares two distributions taken from two zones of the image under the assumption that both distributions are Von Mises. The first part of this parametric test is an equal concentration test with a confidence level $\alpha_\kappa$. In this first part, for $\overline{R}<0.45$, the statistic $$Z = \frac{\frac{2}{\sqrt{3}}[\varphi(\overline{R}_1)-\phi(\overline{R}_2)]}{\sqrt{\frac{1}{n_1-4}+\frac{1}{n_2-4}}} \left(\text{where } \varphi(\overline{R})=\sin^{-1}\left(\min\left\{2\overline{R}\sqrt{\frac{3}{8}},1\right\}\right)\right),$$

is computed and compared with the standard normal deviation. Instead of looking up critical values in tables, the confidence level is computed from the statistic Z using the cumulative normal distribution function $$D(Z) = \frac{1+\text{erf}\left(\frac{Z}{\sqrt{2}}\right)}{2}.$$

Since the critical region consists of equal tails, the confidence level is obtained by writing $\alpha_\kappa=1-2\times|D(Z)-0.5|$. For $0.45\leq \overline{R}<0.7$, the statistic $$Z = \frac{f(\overline{R}_1)-f(\overline{R}_2)}{0.893\sqrt{\frac{1}{n_1-3}+\frac{1}{n_2-3}}}$$

(where $f(\overline{R})=\ln[x+\sqrt{1+x^2}]$, where $$x = \frac{\overline{R}-1.0894}{0.2578}\right)$$

is computed and compared with the standard normal deviation. Instead of looking up critical values in the tables, the confidence level is computed from the statistic Z using the cumulative normal distribution function $$D(Z) = \frac{1+\text{erf}\left(\frac{Z}{\sqrt{2}}\right)}{2}.$$

Since the critical region consists of equal tails, the confidence level is obtained by writing $\alpha_\kappa=1-2|D(Z)-0.5|$. For $\overline{R}\geq 0.7$, the statistic $$Z = \frac{n_1(1-\overline{R}_1)(n_2-1)}{n_2(1-\overline{R}_2)(n_1-1)}$$

is computed and compared with the Fisher critical values for the distribution with $n_1-1$ and $n_2-1$ degrees of freedom. The Fisher critical values can be looked up in tables or found using its cumulative distribution function as follows:

$$F_{n,m}(x) = \frac{2n^{(n-2)/2}\left(\frac{x}{m}\right)^{n/2}{}_2F_1\left(\frac{m+n}{2},\frac{n}{2};1+\frac{n}{2};-\frac{nx}{m}\right)}{\frac{\Gamma\left(\frac{n}{2}\right)\Gamma\left(\frac{m}{2}\right)}{\Gamma\left(\frac{n}{2}+\frac{m}{2}\right)}}$$

$${}_2F_1(a,b;c;z) = \frac{\Gamma(c)}{\Gamma(b)\Gamma(c-b)}\times\int_0^1\frac{t^{b-1}(1-t)^{c-b-1}}{(1-tz)^a}dt$$

$${}_2F_1(a,b;c;z) \approx \frac{\Gamma(c)}{\Gamma(b)\Gamma(c-b)}\times\frac{1}{N}\sum_{t=0}^N\frac{\left(\frac{t}{N}\right)^{b-1}\left(1-\frac{t}{N}\right)^{c-b-1}}{\left(1-\frac{t}{N}z\right)^a}$$

Since the critical region consists of equal tails, the confidence level can be obtained by writing $\alpha_\kappa=1-2\times|D(Z)-0.5|$.

The second part of the parametric test for repeatability of the distribution of the orientation field is an equal mean directions test with a confidence level $\alpha_\mu$. In this test, the test statistic $$F_{1,N-2} = \frac{\left(1 + \frac{3}{8\kappa}\right)(N-2)(n_1 \overline{R}_1 + n_2 \overline{R}_2 - N\overline{R})}{(N - n_1 \overline{R}_1 - n_2 \overline{R}_2)}$$

is computed and compared with the Fisher critical values for the distribution with 1 and N−2 degrees of freedom. For this particular test, the Fisher critical values are provided by a table lookup operation for the following confidence level $\alpha \in \{10\%, 5\%, 2.5\%, 1\%\}$. If the data are not normally distributed (c.f. Chi-Square test for normality), or if the confidence level for the equal concentration test is $\alpha_\kappa < 0.05$, then the confidence level for the repeatability test is given a value of 0. Otherwise, the confidence level of the mean directions test is then the confidence level $\alpha_\mu$ of the repeatability test.

The equal concentrations part or the mean equal directions part of the second repeatability test can fail for very narrow distributions of angles and high values of the estimated concentrations. This likely happens because of the value of the concentrations estimates becoming less reliable when the distributions are narrow, or the test becoming more sensitive with $\overline{R}_1$ and $\overline{R}_2$ being very close to 1 (for both the concentration and the mean orientation test). Consequently, if desired, the second repeatability test can be bypassed when both the estimates of $\tilde{\kappa}$ are above the threshold of 20 and the difference of mean directions is less than 15°. More particularly,

```
if ([κ₁ > 20] and [κ2 > 20] and ⌊|μ₁ − μ₂| < 15° ⌋)
    α = 1
else
    execute the second repeatability test
endif
```

Once the second repeatability test is executed for all the $C_9^2 = 36$ possible pairs of zones, the score for the second repeatability test is computed as follows $$repeatability_2 = \frac{\sum_{i \in [1,9]} \sum_{j \in [1,9], i \neq j} \alpha_{Z_i, Z_j}}{C_9^2}.$$

Details regarding the first and second parts of the second repeatability test are set forth in is described in Mardia, "Statistics of Directional Data", Academic Press, New York, 1972, pp. 161-162 (equal concentration) and pp. 152-155 (equal means direction), which is herein incorporated by reference in its entirety.

The scores of the first and second repeatability tests are then added to provide a total repeatability score (e.g., repeatability=repeatability₁+repeatability₂).

Finally, the normality, nonuniformity and repeatability tests at a given scale (given size of the orientation kernel) are grouped together. For example, they are grouped together as follows:

$$orientation\_stationarity = \frac{1}{4} normality + \frac{4}{4} nonuniformity + \frac{1}{2} repeatability.$$

Preferably, the size of the kernel is set to ½ of the smallest image dimension. Note that the orientation stationarity scores are expressed in percentages.

Figure 7:
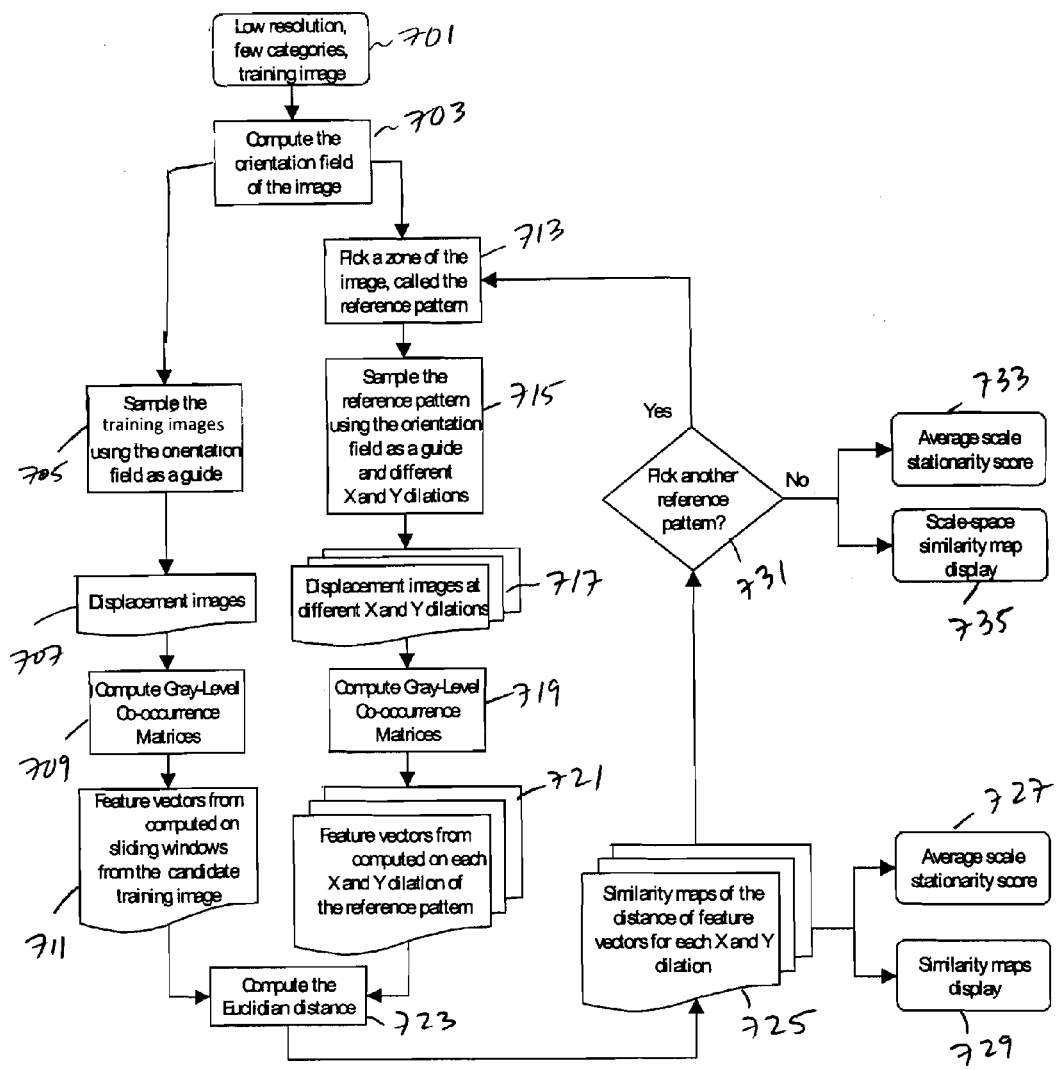
FIG. 7 is a flowchart illustrating operations that generate scale stationarity statistics and a score based thereon as part of the workflow of FIG. 1(B).

FIG. 7 illustrates the operations of block 111B (FIG. 1(B)) that characterize the scale and affinity stationarity of the training image of block 109. The scale and affinity stationarity of the training image is rotation-dependent. Therefore, the operations on the training image (labeled block 701) begin by computing the orientation field of the training image (block 703). Preferably, the orientation field of the training image is computed using the same technique and parameters as described above with respect to blocks 407 to 409 of FIG. 4. The orientation field is computed for all the categories of the training image. The textural attributes used for the computation of the scale and affinity statistics are features extracted from Gray Level Co-Occurrence Matrices (explained below with respect to blocks 709 and 719). This methodology requires measuring the difference in gray level intensity between neighboring pairs of pixels at given displacements. Each pixel of the image is compared with pixels from the same image but taken at a number of different displacements (in the preferred embodiment, 28 different displacements). For a particular displacement, the displaced pixels are grouped into a displacement image. Therefore, in the preferred embodiment, we have 28 displacement images. In blocks 705 and 707, the training image is sampled using the orientation field as a guide to extract a number of different displacement images (in the illustrative embodiment, 28 different displacement images). In the preferred embodiment as described below, the orientation information is integrated into the displacement images utilizing rotation-dependent sampling. These displacement images are used to compute Gray Level Co-Occurrence Matrices of small sliding windows scanned over the image (block 709). Textural feature vectors are derived from these Gray Level Co-Occurrence Matrices (block 711).

In a parallel path, a region (or zone) of the training image is selected (block 713). This region or zone, which is referred to below as a reference pattern, has the same dimensions as the sliding windows used in block 709. Similar to the operations of blocks 705-711, the reference pattern is sampled using the orientation field as a guide (block 715). However, when sampling the small image of the reference pattern, not only is the image corrected for orientation but different affinity transformations are imposed on the circular neighborhood system used for sampling. By modifying the affinity factors, different scales and elongations along the X and Y axis are obtained, thereby deriving displacement images at different affinities (block 717). Thus, in the preferred embodiment, instead of having just 28 displacement images and 1 vector of textural attributes (as is the case for the training image), the operations generate from the reference pattern 28×N displacement images and N vectors of textural attributes for the reference pattern, where N is a number of (X, Y) affinity couples. For each choice of the X and Y affinity, a rotation-dependent sampling of the reference pattern is performed. In the illustrative embodiment shown in FIG. 10, N is chosen to be equal to 25 with 5 possible values for the affinity along the X axis (e.g., x0.5, x0.667, x1, x1.5, x2) and 5 possible values for the affinity along the Y axis (e.g., x0.5, x0.667, x1, x1.5, x2). The displacement images generated in block 719 are used to compute Gray Level Co-Occurrence Matrices of small sliding windows scanned over the image (block 719). Textural feature vectors are derived from these Gray Level Co-Occurrence Matrices (block 721). The textural feature vectors generated in block 721 are derived from different scale transformations (which are sometimes referred to herein as "affinity dilations") of the same reference pattern. In block 723, the operations measure the similarity (e.g., a Euclidian distance) between the texture feature vectors generated in block 721 and the texture feature vectors generated in block 711. In block 725, for a given zone (sliding window) of the training image, the operations select the affinity transform that yields a dilated version of the reference pattern that minimizes the similarity measure calculated in block 723. These results can be interpreted as an affinity map of the training image under the assumption that one unique reference pattern is reproduced over the whole image at different scales. In block 727, stationarity statistics and a score are computed using the affinity transforms identified in block 725. In block 729, the affinity maps (also referred to herein as similarity maps) can be displayed. The statistics and score computed in block 727 and the affinity map displayed in block 729 relate to the particular reference pattern selected in block 713.

In block 731, it is determined whether the operations should revert back to block 713. This decision can be made in accordance with user input or automatically by a sliding window. If the decision in block 731 is yes, another reference pattern is selected in block 713 and stationarity statistics and a score related thereto are generated in blocks 715-729 as described above. If the decision in block 731 is no, an average of the scores generated in block 727 over a number of reference patterns can be computed in block 733, and/or a composite affinity map derived from the affinity maps generated in block 725 over a number of reference patterns can be displayed in block 735, and the processing ends.

Figure 8:
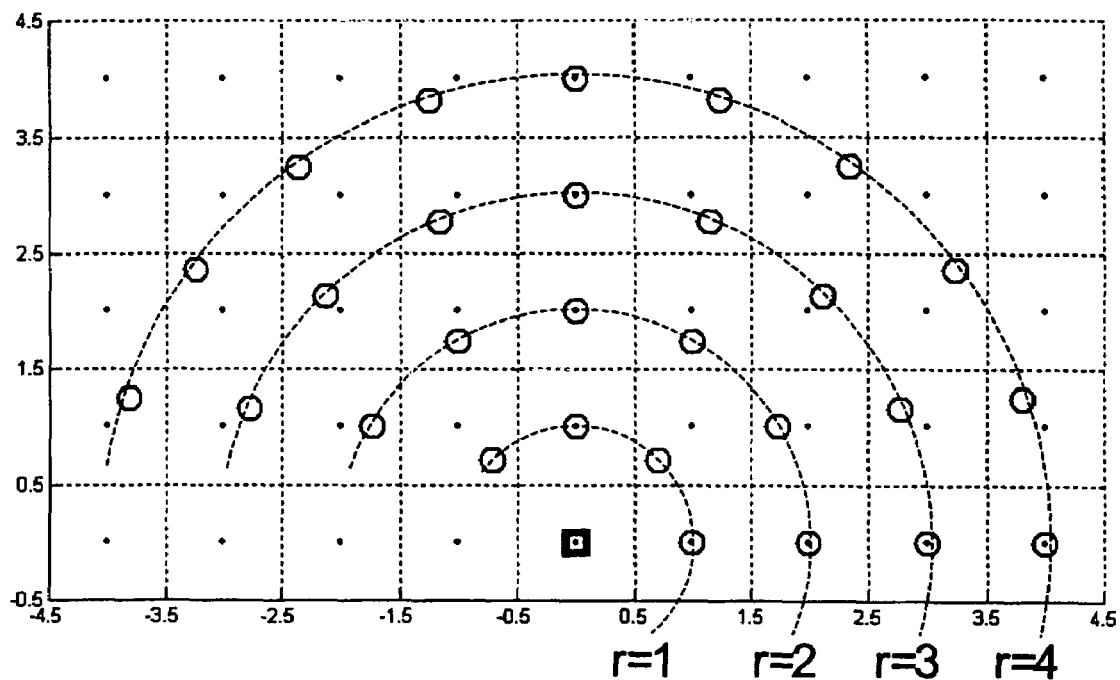
FIG. 8 is a graph illustrating a circular 4-th order neighborhood sampling system.

In the preferred embodiment, the derivation of the displacement images in blocks 705/707 and blocks 715/717 employ the principal of the N-th order circular neighborhood system, which is explained in detail in Deng et al., "Gaussian MRF Rotation-Invariant Features for Image Classification," IEEE Transactions on Pattern Analysis and Machine Intelligence, Vol. 26, No. 7, July 2004. More particularly, this isotropic circular neighborhood system is used for the sampling of neighbor pixels relative to a reference central pixel. The sampled neighbors are all situated on concentric circles of pixel radius r=1, r=2, r=3, ... r=N where N is the order of the neighborhood. A bilinear interpolation may be used to interpolate the intensity values of samples that do not fall exactly on the center of the pixels. FIG. 8 illustrates the circular 4-th order neighborhood system used in the preferred embodiment, with respectively 4, 6, 8 and 10 samples taken on the semi-circles of radius $r_1=1$, $r_2=2$, $r_3=3$ and $r_4=4$. These samples sum to provide 4+6+8+10=28 displacement points a follows:

$$\forall k \in [1,4], \begin{cases} \theta_k = \frac{(k-1)\pi}{4} \\ u_k = r_1\cos(\theta_k) \\ v_k = r_1\sin(\theta_k) \end{cases} \quad \forall k \in [5,10], \begin{cases} \theta_k = \frac{(k-5)\pi}{6} \\ u_k = r_2\cos(\theta_k) \\ v_k = r_2\sin(\theta_k) \end{cases}$$

-continued $$\forall k \in [11,18], \begin{cases} \theta_k = \frac{(k-11)\pi}{8} \\ u_k = r_3\cos(\theta_k) \\ v_k = r_3\sin(\theta_k) \end{cases} \quad \forall k \in [19,28], \begin{cases} \theta_k = \frac{(k-19)\pi}{10} \\ u_k = r_4\cos(\theta_k) \\ v_k = r_4\sin(\theta_k) \end{cases}$$

Such a sampling has the advantage of providing a complete coverage of each pixel in the circular neighborhood without falling into the trap of sampling several times the same pixel or pair pixels.

For the operations of blocks 705 and 707 that generate the displacement images for the training image, the circular neighborhood system is adapted for rotation-dependent sampling. More particularly, let u and v be the coordinates column vectors of the sampling points in the X-Y plane for a rotation angle of 0, and let u' and v' be their result after a rotation of an angle φ in the rotation-dependent neighborhood sampling. The rotation by an angle φ of the neighborhood sampling coordinates is then:

$$\begin{bmatrix} u'^T \\ v'^T \end{bmatrix} = \begin{bmatrix} \cos(\varphi) & \sin(\varphi) \\ -\sin(\varphi) & \cos(\varphi) \end{bmatrix} \begin{bmatrix} u^T \\ v^T \end{bmatrix}$$

Figure 9:
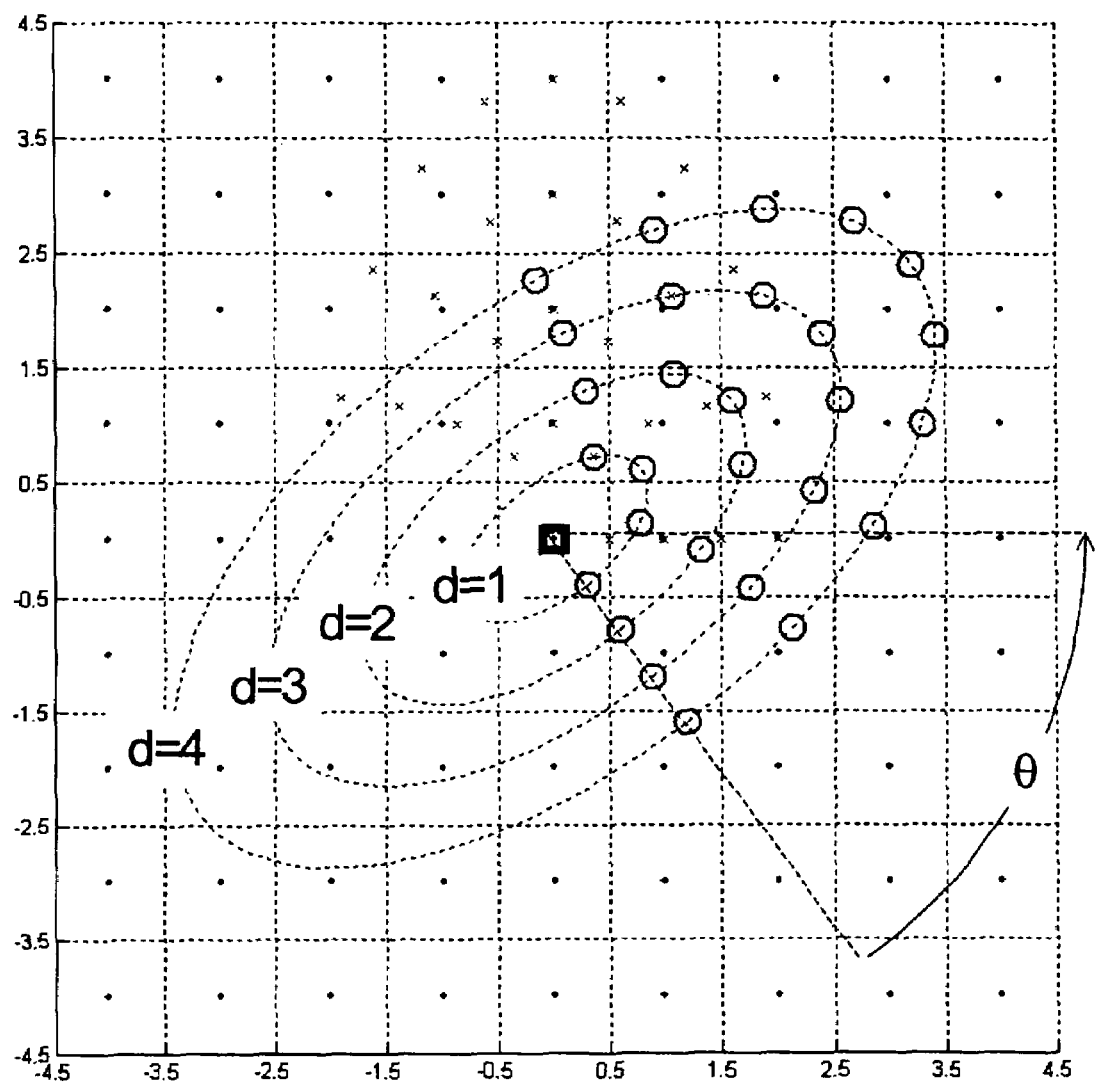
FIG. 9 is a graph illustrating a circular 4-th order neighborhood sampling system adapted for rotation-and-scale-dependent sampling; the rotation-dependent sampling is used to sample the training image and extract feature vectors from the training image; the rotation-and-scale-dependent sampling is used to sample a reference pattern and extract feature vectors from the reference pattern; these feature vectors are analyzed to generate scale stationarity statistics and a score based thereon as part of the workflow of FIG. 1(B).
Figure 10A:
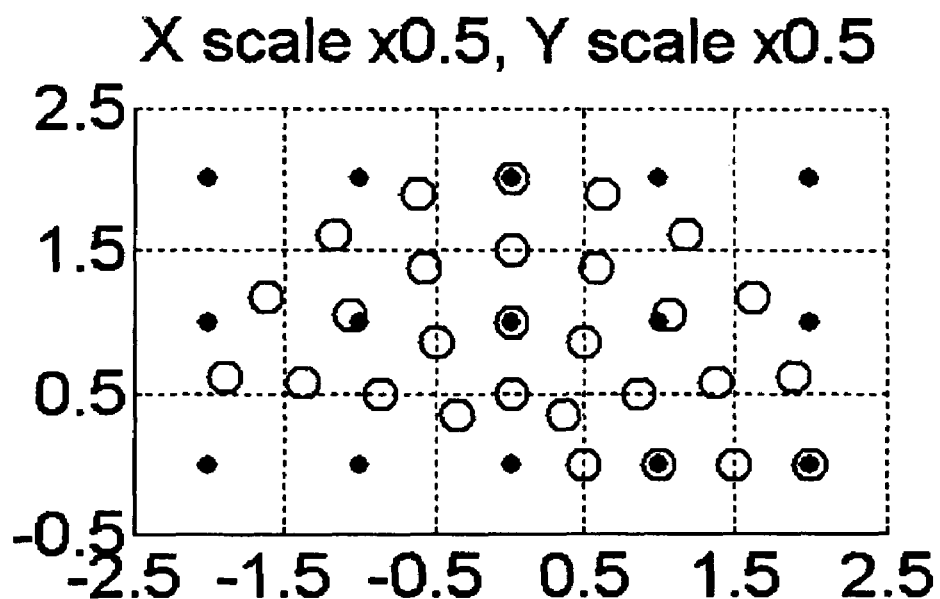
FIGS. 10(A)-10(Y) are diagrams illustrating a set of 25 affinity factor couples; these affinity factor couples are used in computing scale stationarity statistics and a score based thereon as part of the workflow of FIG. 1(B).
Figure 10B:
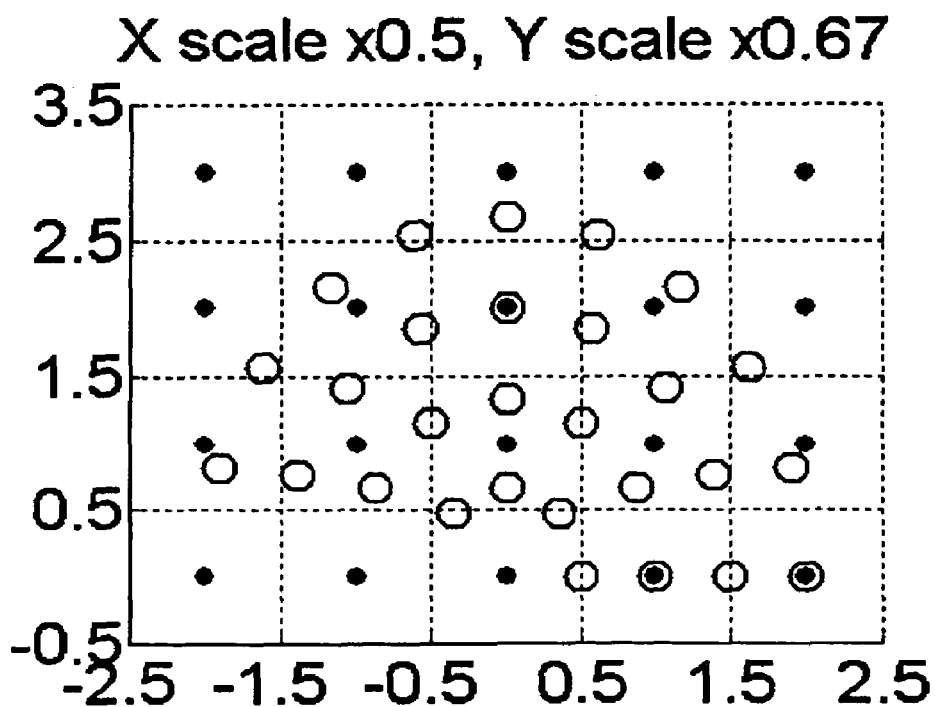
Figure 10C:
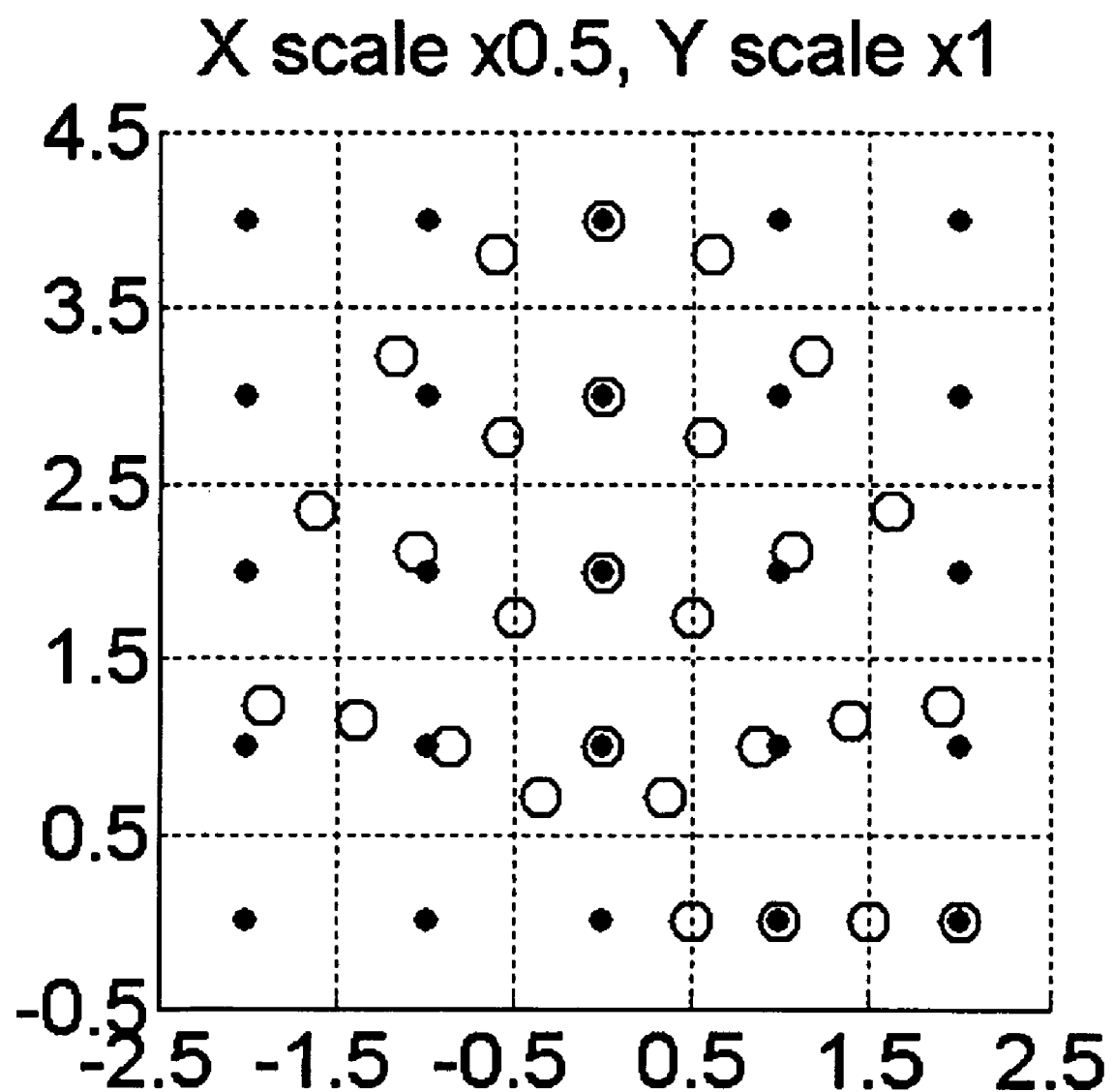
Figure 10D:
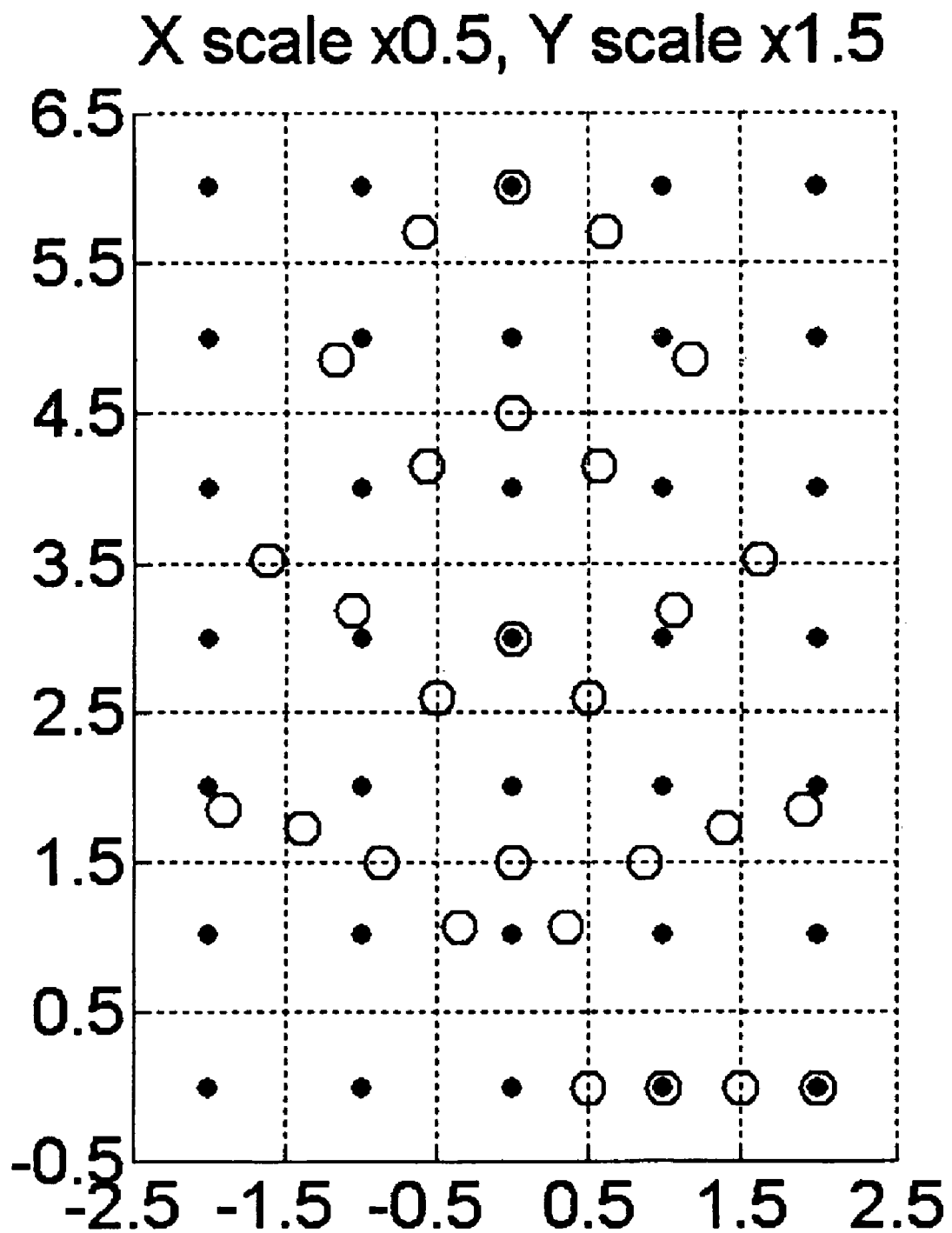
Figure 10E:
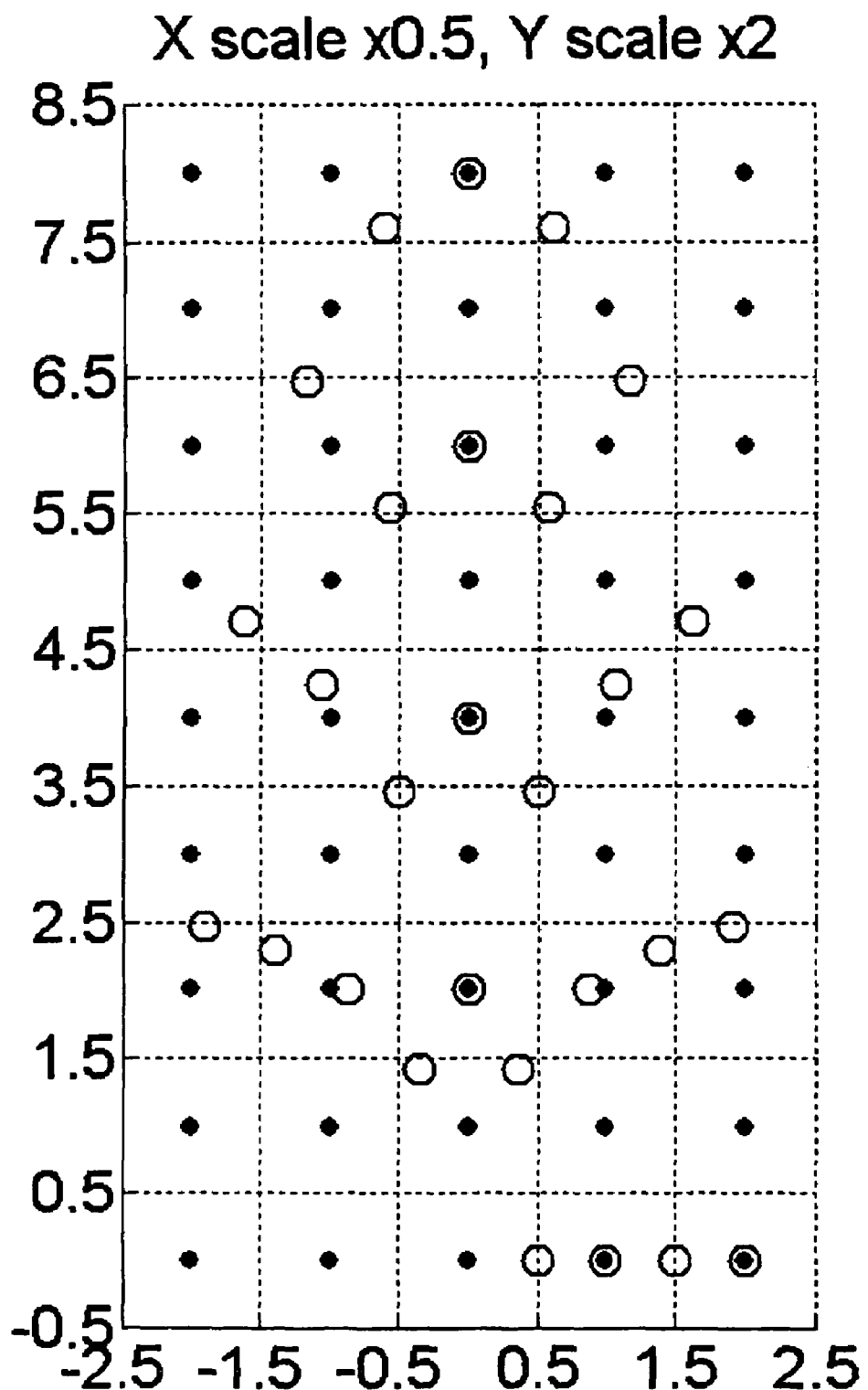
Figure 10F:
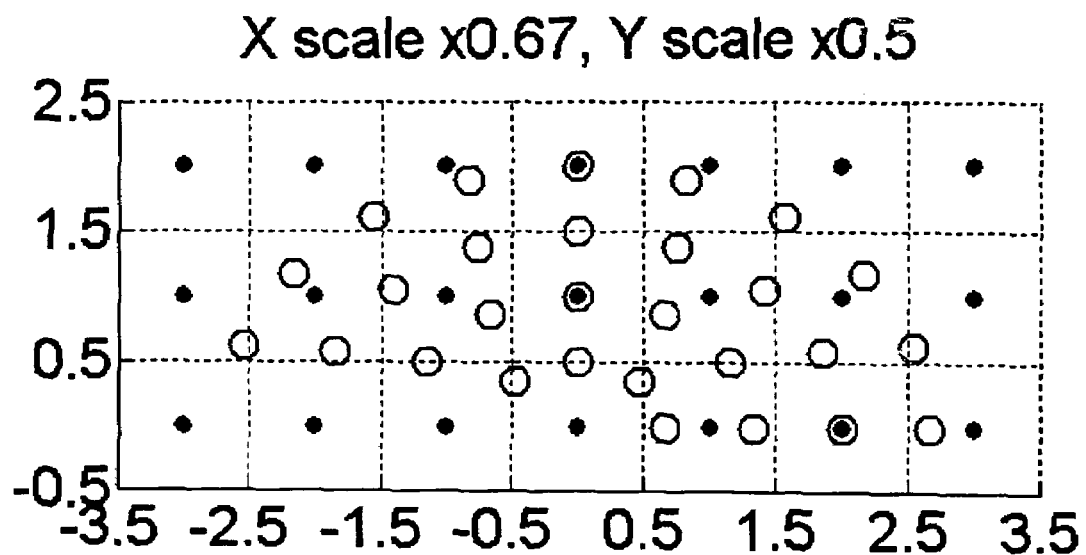
Figure 10G:
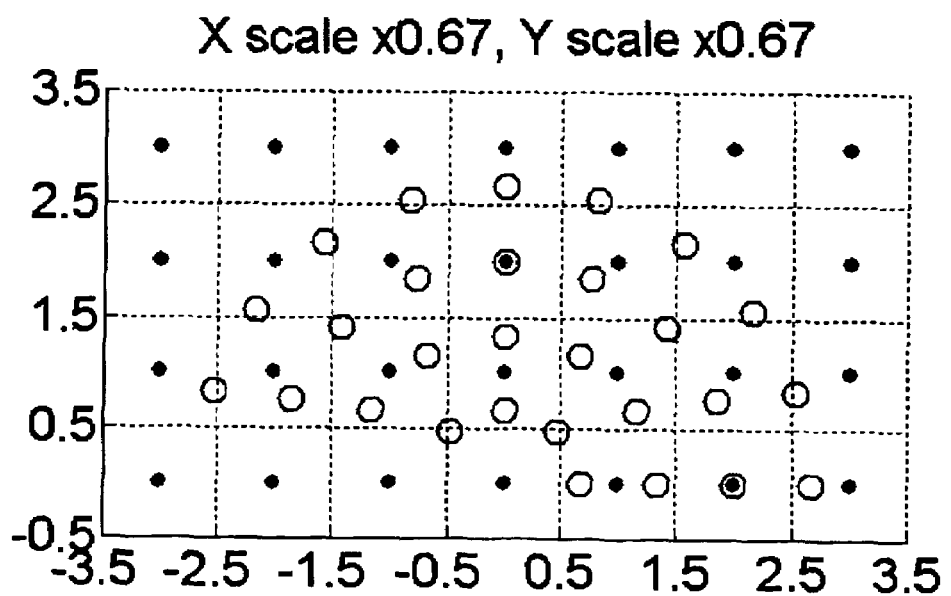
Figure 10H:
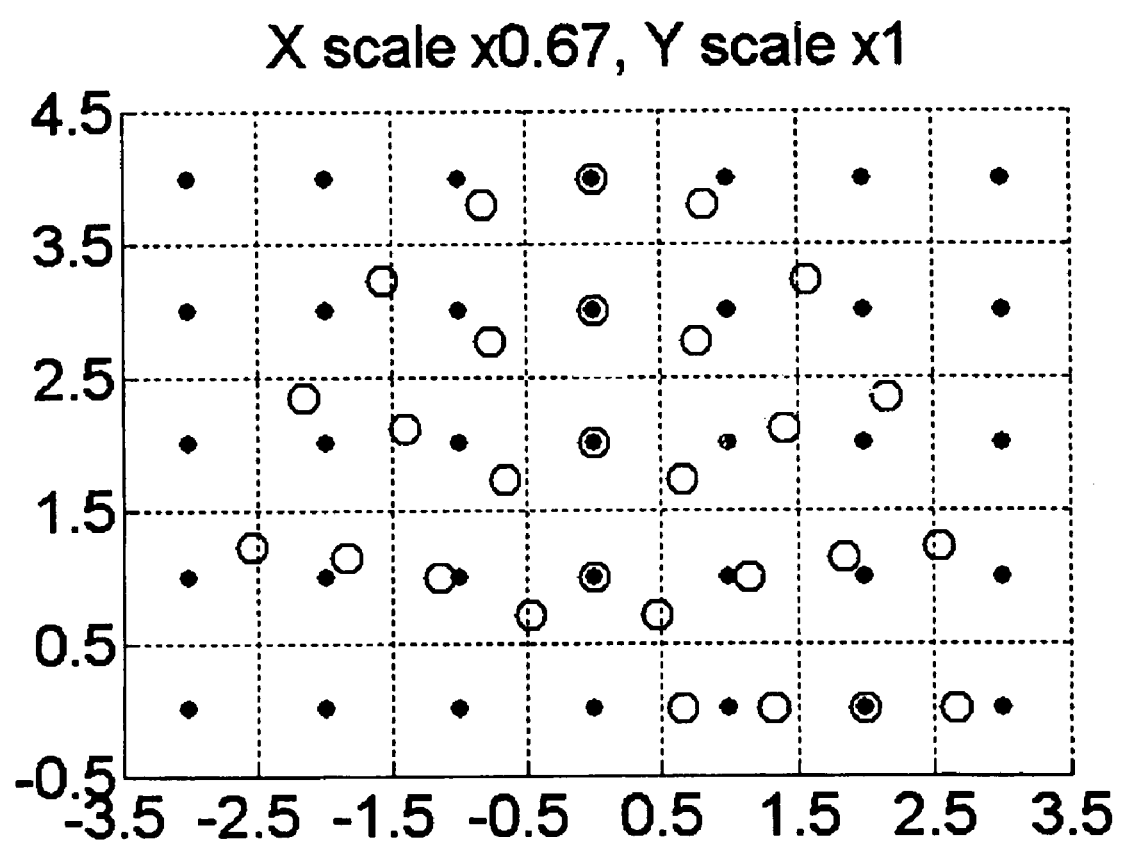
Figure 10J:
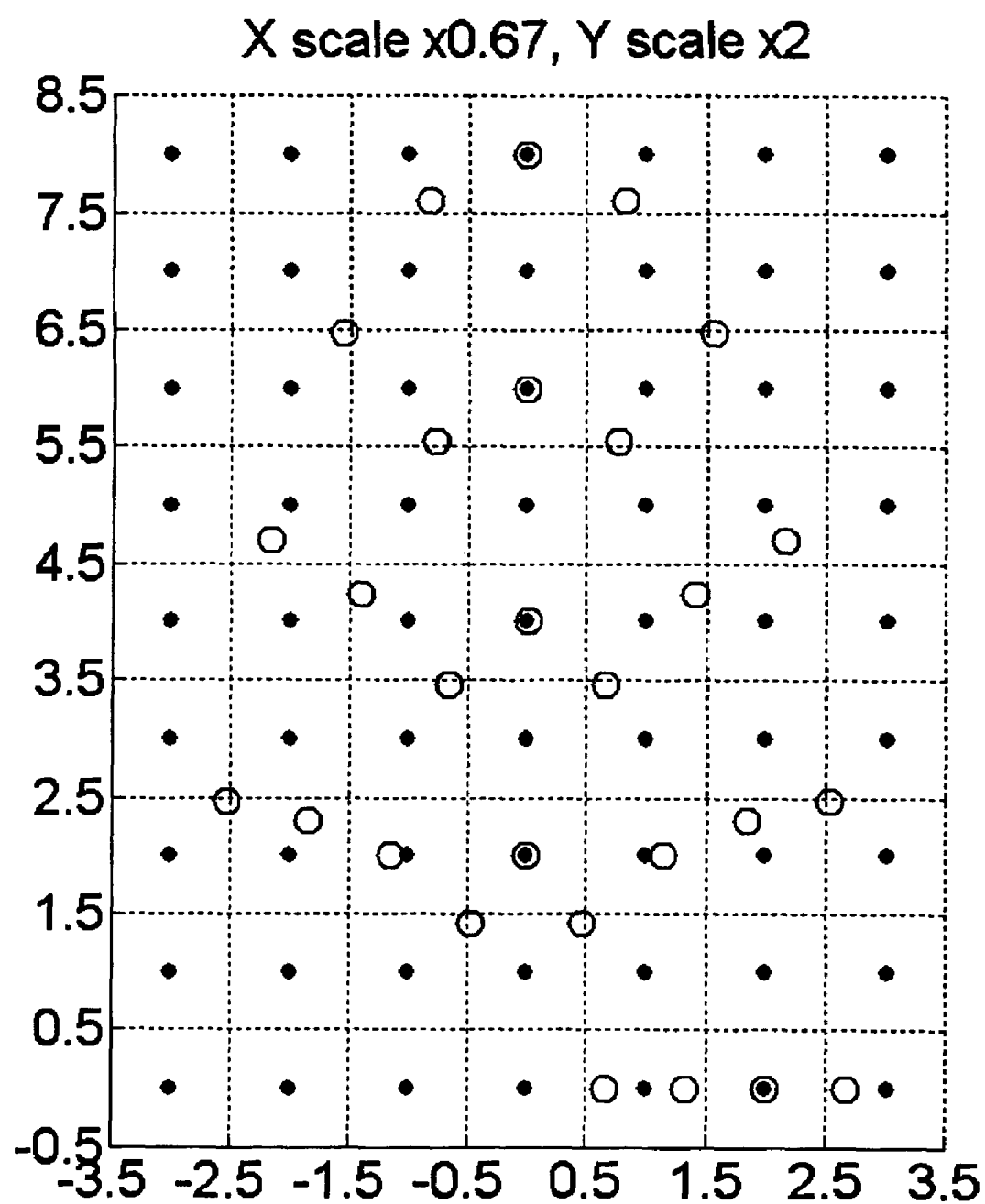
Figure 10K:
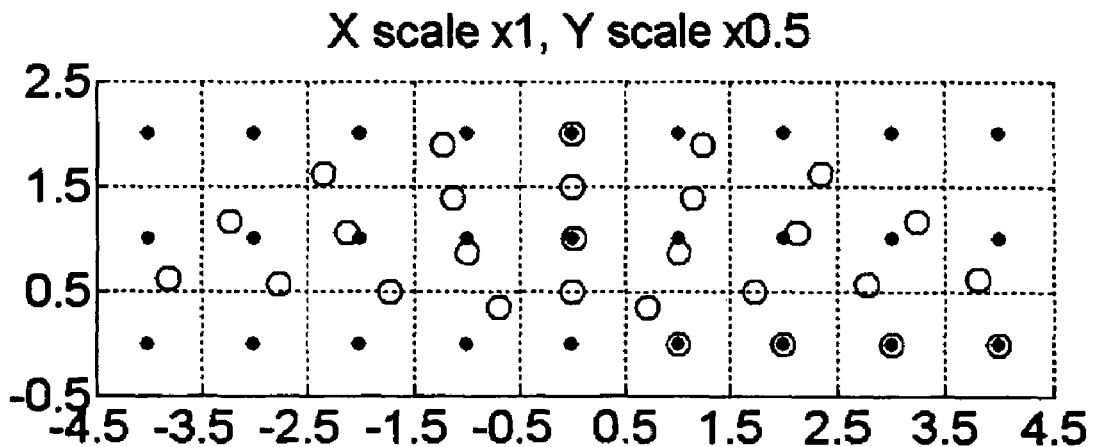
Figure 10L:
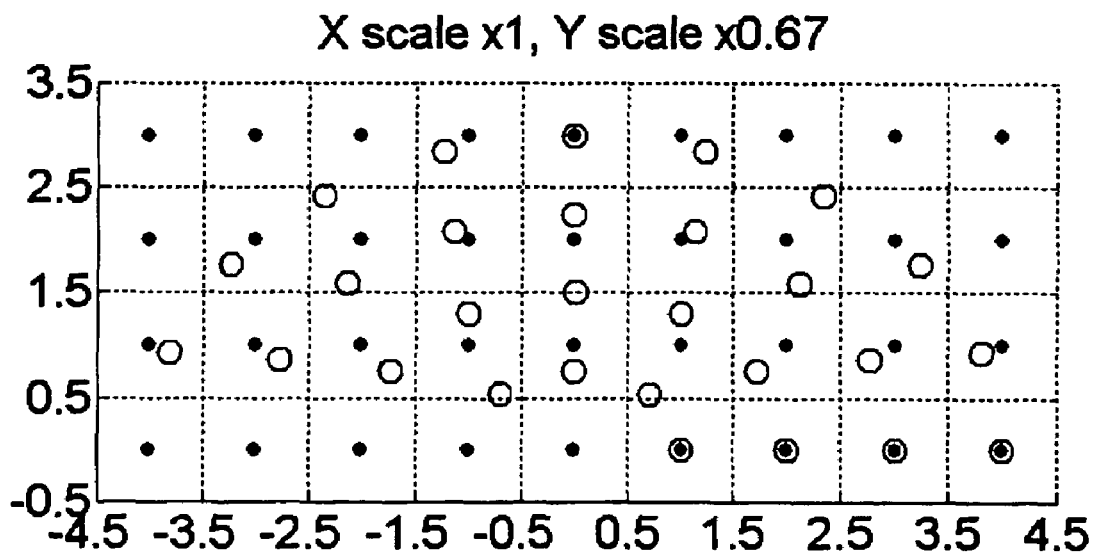
Figure 10M:
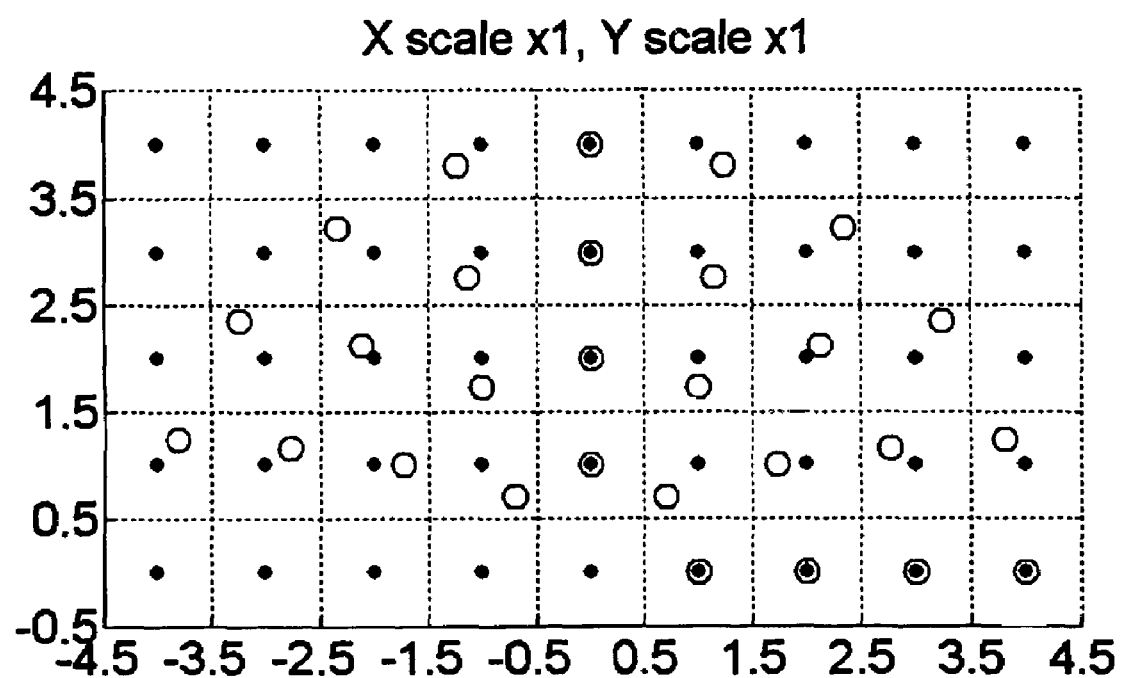
Figure 10N:
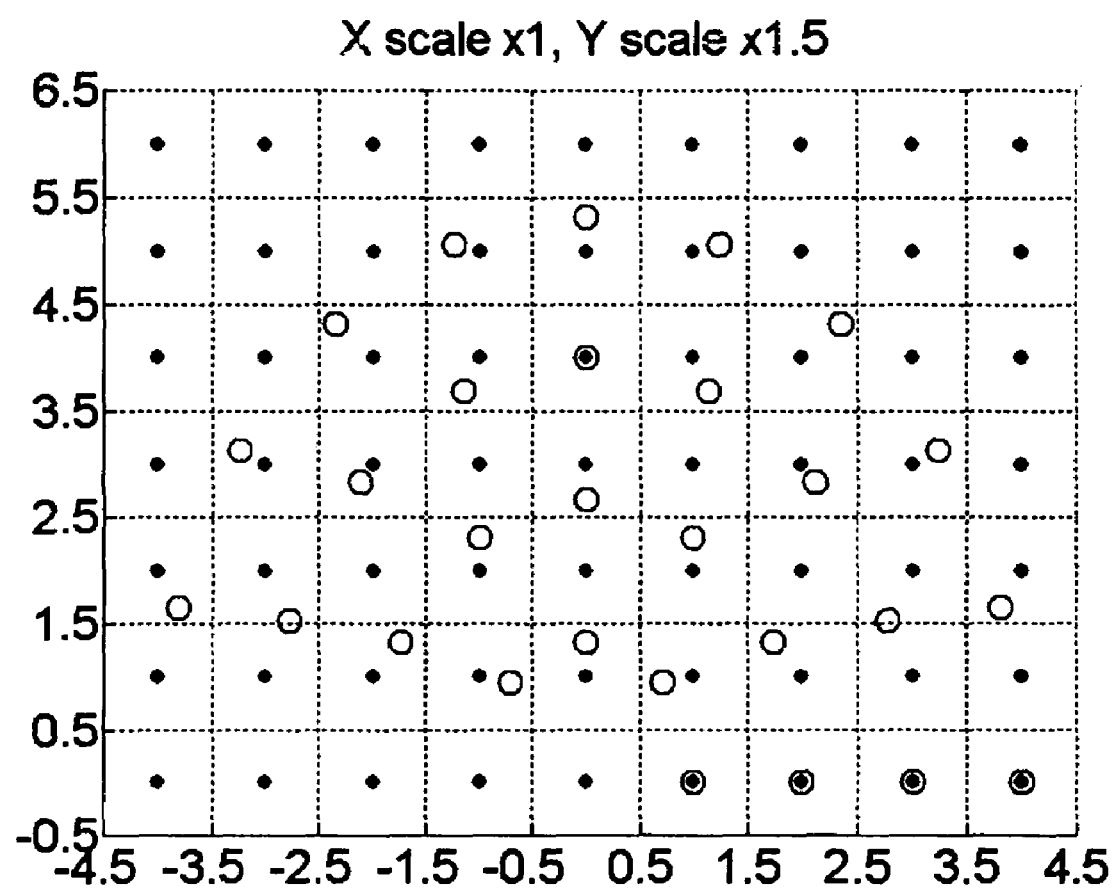
Figure 10O:
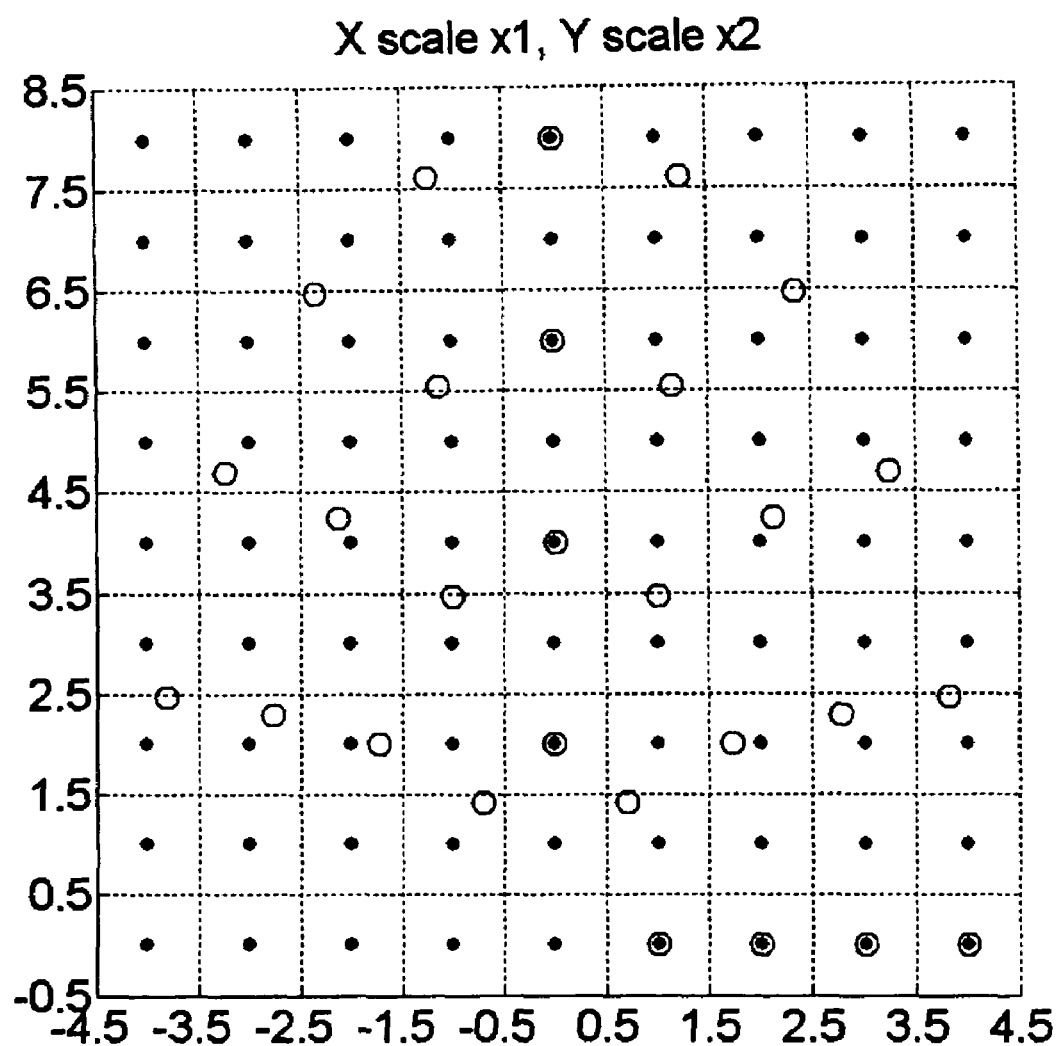
Figure 10P:
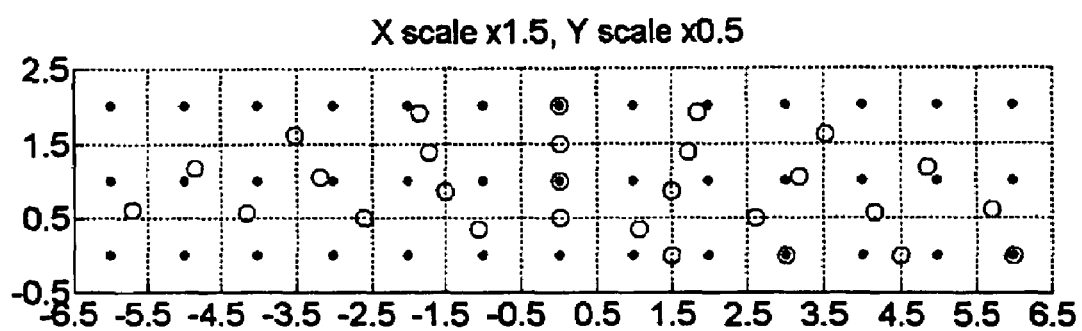
Figure 10Q:
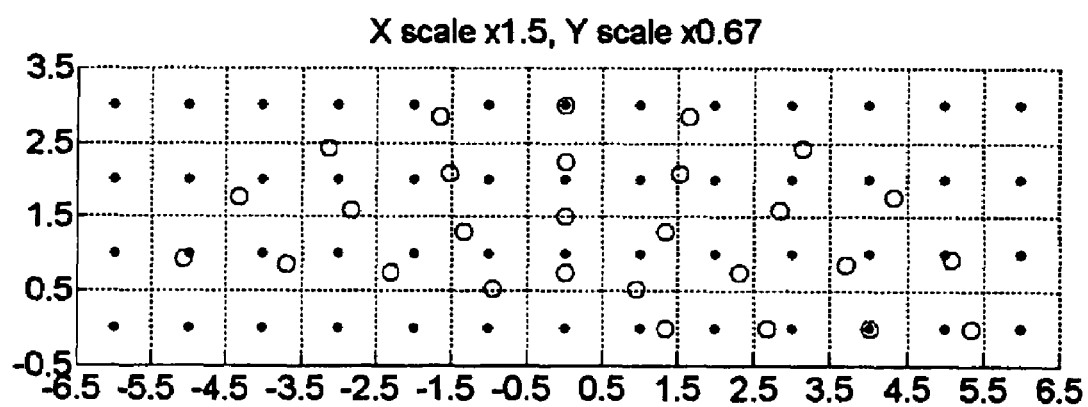
Figure 10R:
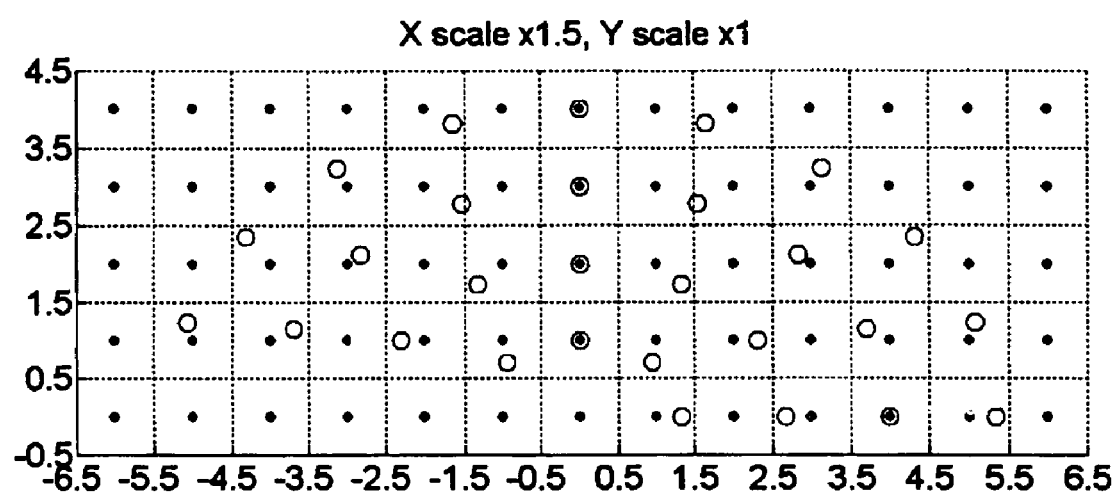
Figure 10S:
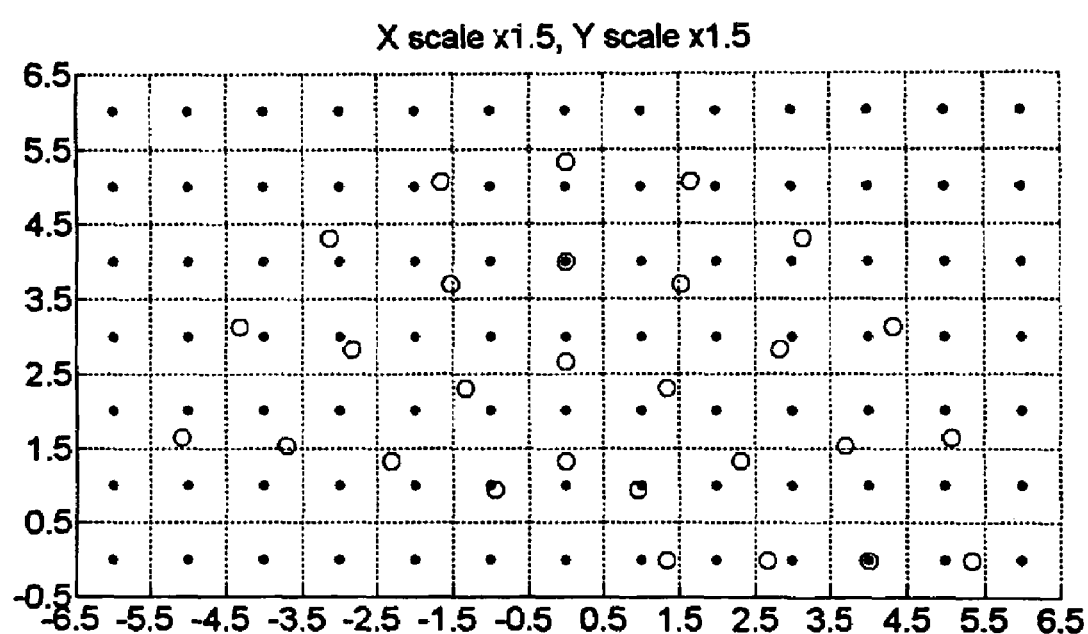
Figure 10T:
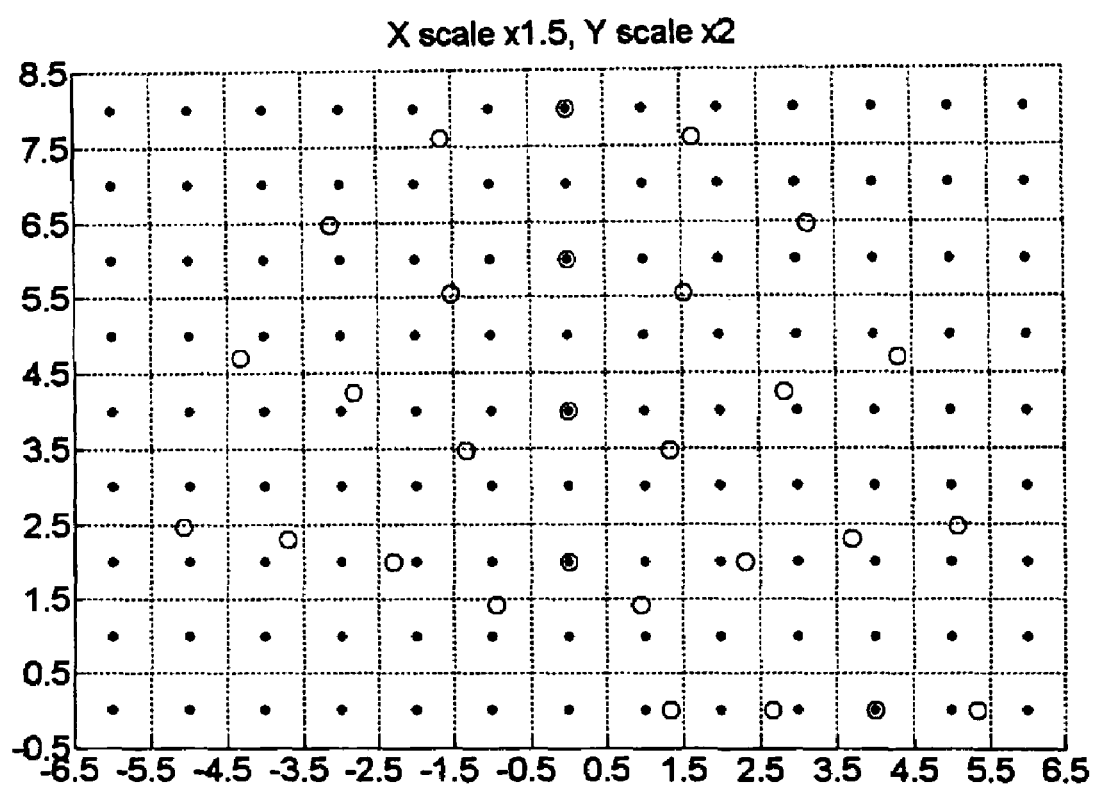
Figure 10U:
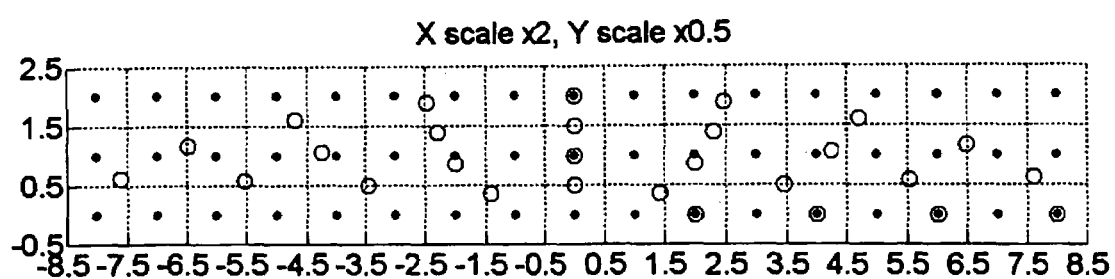
Figure 10V:
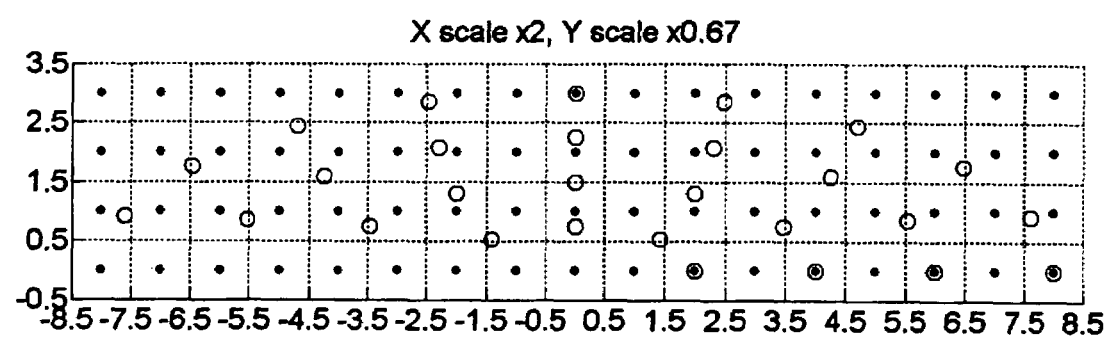
Figure 10W:
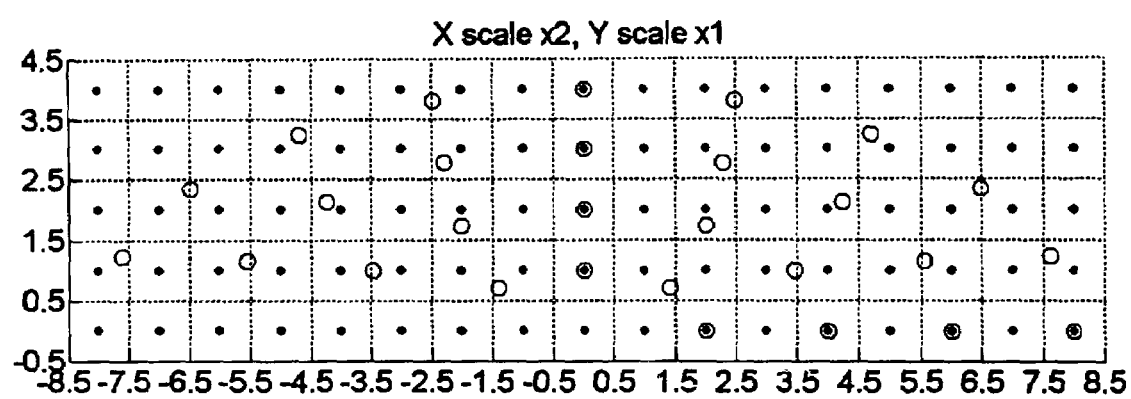
Figure 10X:
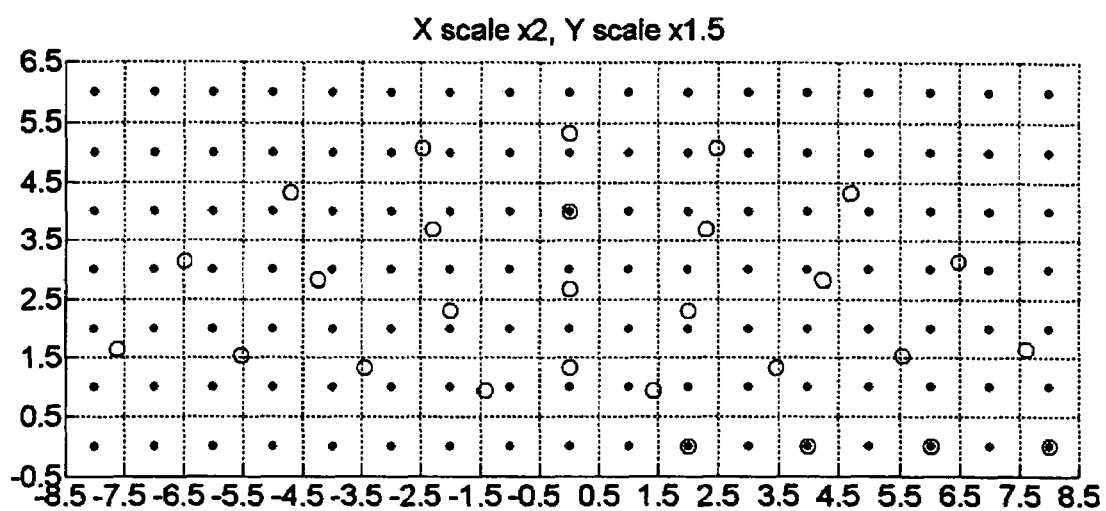
Figure 10Y:
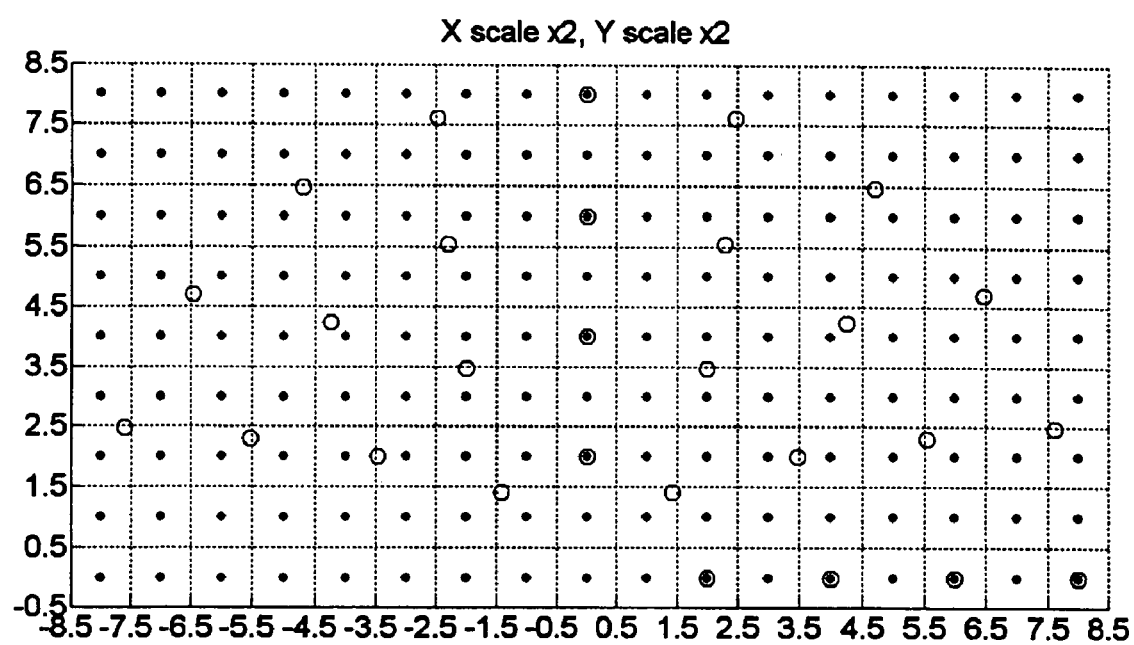

An exemplary embodiment of such rotation-dependent sampling using a 4-th order circular neighborhood sampling system is illustrated in FIG. 9, with a rotation φ=−60 degrees. The embodiment of FIG. 9 also adds scale-dependent sampling as described below, which can be ignored for the purposes of blocks 705 and 707. Like the un-rotated neighborhood sampling, a bilinear interpolation may be used to interpolate the intensity values of samples that do not fall exactly on the center of the pixels. Since the image representation on screen uses the indirect Cartesian coordinates system where the Y-axis is inverted and oriented "downwards" whereas the X-axis is still oriented "rightwards", a rotation by an angle of −φ is applied to the circular neighborhood sampling coordinates. The rotation parameters of the neighborhood sampling system described above are derived from the orientation field vectors computed in block 703. More particularly, for each pixel of the training image or each pixel of the reference pattern, there is one value of the direction φ of the orientation vector, yielding the parameter φ of the rotation of the neighborhood sampling system. In the preferred embodiment, the rotated circular neighborhood sampling produces 28 displaced pixels for each pixel of the training image. In this manner, the rotation-dependent sampling yields 28 displacement images of the training image for subsequent analysis in block 711.

For the operations of blocks 715 and 717 that generate the displacement images for a particular reference pattern, the circular neighborhood system is adapted for rotation-and-scale-dependent sampling. More particularly, an affinity transform of the n-th order neighborhood sampling system is used in order to capture textural features at a given local X and Y scale and a given local orientation. This approach is the reverse of the stochastic generation of images through multipoint geostatistics. Indeed, as explained in Caers, "Geostatistical history matching under training-image based geological model constraints," SPE Journal, No. 74716, 2003, pp. 218-226, the local scale (affinity) and orientation information can be used to control the realization of a stochastic process and enables the repetition of a pattern at varying scales and orientations. The affinity factors $a_x$ and $a_y$ describe the scale transformation (dilatation) of the reference pattern along the X-axis and the Y-axis, respectively. In the illustrative embodiment shown in FIG. 10, there are 5 possible values for the affinity factor $a_x$ (e.g., x0.5, x0.667, x1, x1.5, x2) and 5 possible values for the affinity factor $a_y$ (e.g., x0.5, x0.667, x1, x1.5, x2), thereby provide a total of 25 different affinity factor pairs (or couples). When the aspect ratio $a_y/a_x$ is not 1, then that pattern is elongated either along the X-axis or the Y-axis. The total affinity and rotation transformation of the circular neighborhood sampling coordinates can be written as follows:

$$\begin{bmatrix} u''^T \\ v''^T \end{bmatrix} = \begin{bmatrix} \cos(\varphi) & \sin(\varphi) \\ -\sin(\varphi) & \cos(\varphi) \end{bmatrix} \begin{bmatrix} a_x & 0 \\ 0 & a_y \end{bmatrix} \begin{bmatrix} u^T \\ v^T \end{bmatrix}.$$

An illustration of a rotated and scaled 4-th order circular neighborhood sampling system is given in FIG. 9 with a rotation $\phi=-60$ degrees and the affinity factor couple $(a_x, a_y)=(0.5, 1)$. The affinity factor $a_x$ of 0.5 indicates that the neighborhood sampling "zooms" along the X-axis when sampling the pattern. It is equivalent to dilating the reference pattern by a factor of 2 along the X-axis. The rotation parameters of the neighborhood sampling system described above are derived from the orientation field vectors computed in block 703. More particularly, for each pixel of the training image or each pixel of the reference pattern, there is one value of the direction $\phi$ of the orientation vector, yielding the parameter $\phi$ of the rotation of the neighborhood sampling system. The affinity parameters $(a_x, a_y)$ are constant on all the image. However, for each set of those affinity parameters, a new set of displacement images are computed for subsequent analysis in block 721. In the preferred embodiment, the rotation-and-scale-dependent circular neighborhood sampling produces 25 sets of 28 displaced pixels for each pixel of the reference pattern, one set for each combination of X and Y affinity factors. In this manner, the rotation-and-scale-dependent sampling yields 25 sets of 28 displacement images of the reference pattern for subsequent analysis in block 721.

As described above, the operations of blocks 709 and 711 derive textural features (referred to below as "textural attributes" or "elements") from gray level co-occurrence matrices computed on the displacement images of the training image. In the preferred embodiment, the gray level co-occurrence matrices are computed as follows. First, the training image and the displacement images are quantized into G gray levels (for instance G=32). Note that even when performing a multi-resolution analysis of black and white patterns, more than 2 gray levels are used since during the circular neighborhood sampling with scale and orientation transformations, most samples do not fall onto centers of pixels and are interpolated. In addition, if there are more than 2 but less than G categories in the training image, such gray level quantization allows the operations to maintain a distinction between each category. The quantized images are then processed to compute a set of co-occurrence matrices. Each co-occurrence matrix, which can be denoted $C_d(k, l)$, estimates the probability for gray levels k and l to occur on the quantized image $l(x, y)$ at a displacement of d. This probability is measured by counting the number of pairs (x, y) and (x', y') where $l(x, y)=k$, $l(x', y')=l$ and $(x'-x, y'-y)=d$, and then dividing that number of pairs by the total number of neighboring pixels in the image. The set of co-occurrence matrices is generated by comparing each one of the quantized displacement images with the quantized training image. In the preferred embodiment, 28 co-occurrence matrices $C_d(k, l)$ are obtained. For a given displacement d, or for a given couple (training image, displacement image), each element of the co-occurrence matrix follows the formula below:

$$C_d(k,l)=Pr[I(x',y')=l|I(x,y)=k].$$

Figure 11:
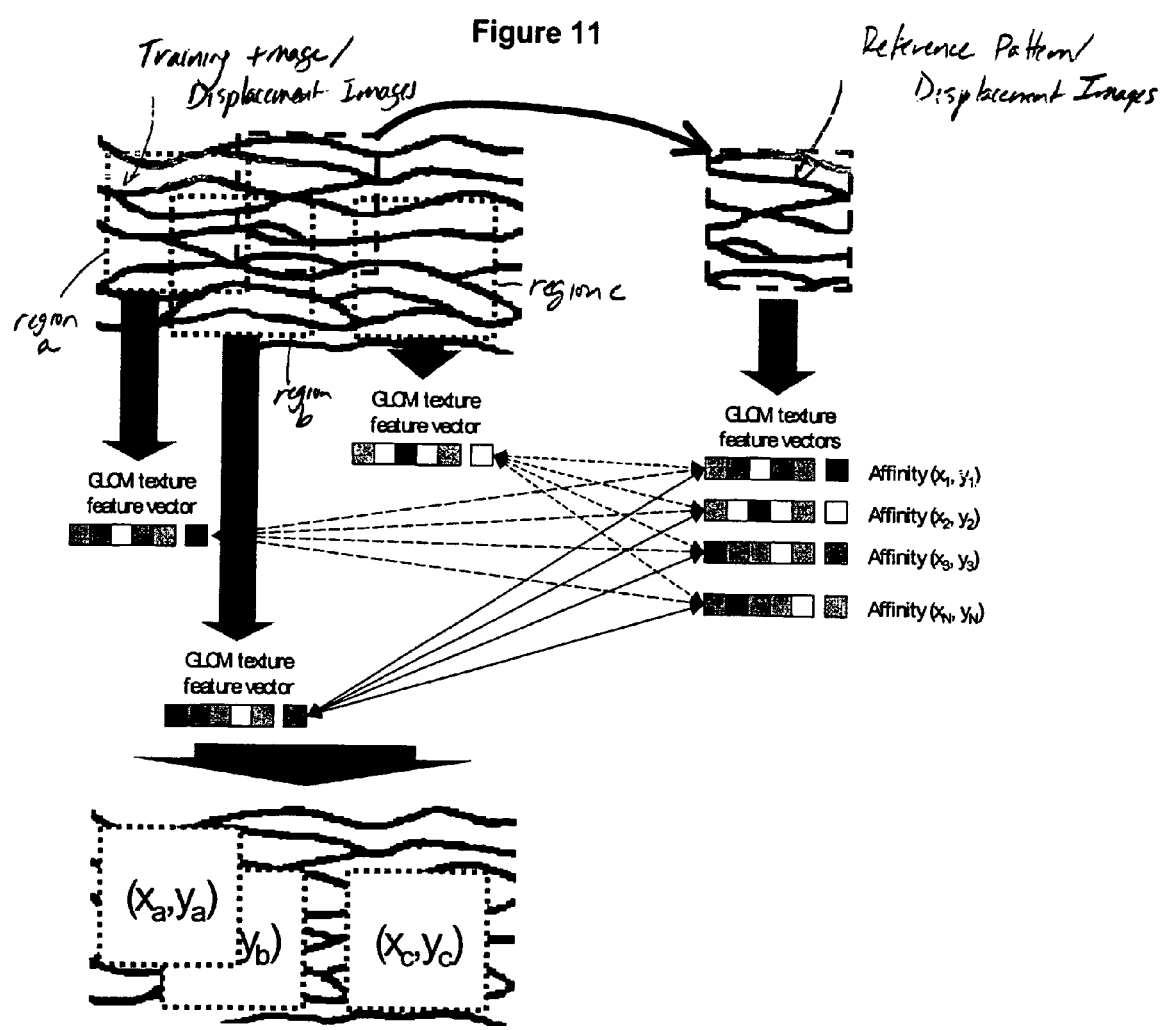
FIG. 11 is a schematic diagram illustrating the operations that compute scale stationarity statistics and an affinity map based thereon as part of the workflow of FIG. 1(B).

As shown in FIG. 11, each co-occurrence matrix is not computed on the whole training image, but on small sliding windows extracted from the image and regularly sampled. FIG. 11 illustrates the generation of co-occurrence matrices (and texture feature vectors derived therefrom). In FIG. 11, the three regions a, b and c illustrate possible locations of the sliding window. In the preferred embodiment, the locations of the sliding window are regularly sampled over the entire training image. For each one of regions a, b, c of FIG. 11, there are 28 displacement images that are interpolated, and 28 subsequent co-occurrence matrices and co-occurrence matrix statistics that are computed. Note that if the size of the sliding window is increased, more textural features are captured; yet the resolution of the affinity maps derived therefrom in block 725 decreases.

After the set of co-occurrence matrices have been computed, six textural features are computed from each co-occurrence matrix using the following formulas, (where p(k,l) is an element of a given co-occurrence matrix):

i) Energy (angular second moment): $\sum_{k=0}^{G-1}\sum_{l=0}^{G-1}[p(k,l)]^2$;

ii) Contrast (inertia): $\sum_{k=0}^{G-1}\sum_{l=0}^{G-1}(k-l)^2 p(k,l)$;

iii) Dissimilarity (absolute value): $\sum_{k=0}^{G-1}\sum_{l=0}^{G-1}|k-l|p(k,l)$;

iv) Inverse difference: $\sum_{k=0}^{G-1}\sum_{l=0}^{G-1}\frac{p(k,l)}{1+(k-l)^2}$;

v) Entropy: $-\sum_{k=0}^{G-1}\sum_{l=0}^{G-1}p(k,l)\log_2[p(k,l)]$; and vi) Maximum probability: $\max_{k,l} p(k,l)$.

More specific details regarding these descriptors can be found in Haralick et al, "Texture Features for Image Classification," IEEE Transactions on Systems Man and Cybernetics, SMC-3, No. 6, 1973, pp. 610-621, and Materka et al., "Texture Analysis Methods—A Review," Technical University of Lodz, Institute of Electronics, COST B11 report, Brussels, 1998, herein incorporated by reference in their entireties. In this manner, a vector of 6 elements characterizes each co-occurrence matrix, which reduces the dimensionality of the textural measures. In the preferred embodiment, the 6 textural features for each one of the 28 co-occurrence matrices are grouped together to generated a vector of 168 elements that are associated with the training image.

In the preferred embodiment, similar operations as those described above with respect to blocks 709 and 711 are performed to derive textural features from gray level co-occurrence matrices computed on the displacement images of the reference pattern in blocks 719 and 721. In such operations, a set of co-occurrence matrices (preferably 28) are computed for each designated affinity factor couple (e.g., for each one the 25 affinity factor couples). Each co-occurrence matrix is computed over the entire reference pattern. The 6 textural features are then generated for each co-occurrence matrix. In the preferred embodiment, 25 vectors of textural features (with each vector containing 168 elements) are generated. The 25 vectors correspond to the 25 affinity factor couples described above with respect to FIG. 10.

As described above, the operations of block 723 measure the similarity (e.g., a Euclidian distance) between the texture feature vectors generated in block 721 and the texture feature vectors generated in block 711. In the preferred embodiment, this is accomplished by generating, for each region r of the training image, the dilation a (out of 25 possible dilations aff) of the reference pattern that minimizes the Euclidian distance between the textural features vectors $V_{T1,r}$ and $V_{RP,aff}$, which is represented mathematically as follows:

$$a(r) = \underset{aff}{\operatorname{argmin}}\left(\sum_{i=1}^{N}[V_{I,r}(i) - V_{RP,aff}(i)]^2\right).$$

The dilation a(r) is computed for each region r as indicated by the thin-lined arrows that link feature vector pairs in FIG. 11. FIG. 11 illustrates the comparison between the texture feature vectors for three different regions a, b, c of the training image and different affinity transformations of the reference pattern, denoted $(x_1,y_1), (x_2, y_2), (x_3,y_3) \ldots (x_N,y_N)$.

The minimum Euclidian distance between feature vectors yields an affinity map showing the best affinity factors for the regions of the training image. FIG. 11 illustrates an exemplary affinity map showing the best affinity parameters $(x_a, y_a), (x_b, y_b), (x_c,y_c)$ for regions a, b, c, respectively. This affinity map can be displayed in block 729 as described above.

Figure 12A:
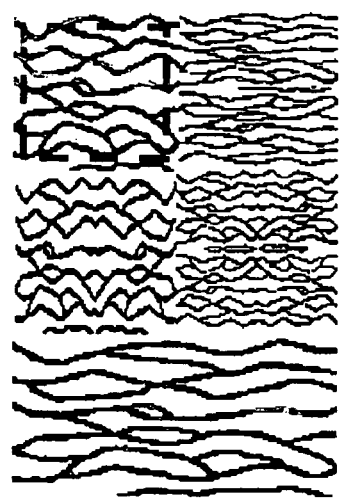
FIG. 12(A) is an exemplary training image, which is derived by copying/pasting the upper left corner (outlined by a rectangle) into the other parts of the image with different affinity transformations applied thereto.
Figure 12B:
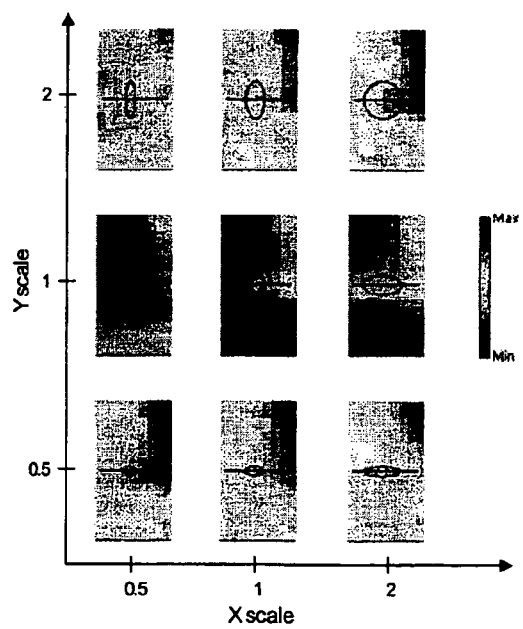
FIG. 12(B) is a set of affinity maps that illustrate the distance between the feature vectors for corresponding parts in the training image and the reference pattern over different affinity factor couples for the training image of FIG. 12(A) with the upper left corner selected as the reference pattern; the pixels of each 2D image are gray-scale with the distances represented by the pixels quantized into a gray-scale range of values.
Figure 12C:
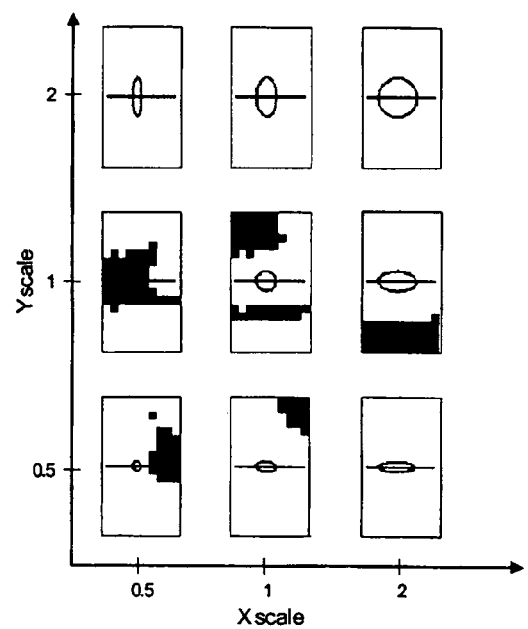
FIG. 12(C) is a set of affinity maps that illustrate the distance between the feature vectors for corresponding parts in the training image and the reference pattern over different affinity factor couples for the training image of FIG. 12(A) with the upper left corner selected as the reference pattern; the pixels of each 2D image are binary with the distances represented by the pixels assigned to a binary range of values; the closest distances are assigned to one binary value (i.e., black), while the other distances are assigned to the other binary value (i.e., white).

FIGS. 12(B) and 12(C) illustrate another form of the affinity map wherein separate 2D images are provided for the affinity factor couples. Each 2D image describes the distance between the feature vectors for corresponding parts in the training image and the reference pattern. In the affinity map of FIG. 12(B), the pixels of each 2D image are gray-scale with the distances represented by the pixels quantized into a gray-scale range of values. In the affinity map of FIG. 12(C), the pixels of each 2D image are binary with the distances represented by the pixels assigned to a binary range of values. The closest distances are assigned to one binary value (i.e., black), while the other distances are assigned to the other binary value (i.e., white). In the example of FIGS. 12(A)-12(C), the image of FIG. 12(A) is obtained by copying/pasting a classical training image (in the upper left corner) at various affinity transformations on the rest of the image: in the upper left corner, the pattern has an affinity transformation ($a_x=1, a_y=1$); in the upper right corner, the pattern is reproduced twice at an affinity transformation ($a_x=1, a_y=0.5$); in the middle left part of the image, the pattern is reproduced twice at an affinity transformation ($a_x=0.5, a_y=1$); in the middle right part of the image, the pattern is reproduced 4 times at an affinity transformation ($a_x=0.5, a_y=0.5$); in the lower part of the image, the pattern has an affinity transformation ($a_x=2, a_y=1$). The entire image of FIG. 12(A) is the training image. The highlighted rectangle in the upper left corner of the image of FIG. 12(A) is selected as the reference pattern. The affinity map of FIG. 12(B) shows the gray-scale distance between textural feature vectors extracted from the training image and textural feature vectors of the reference pattern for 9 different affinity factor couples. The affinity map of FIG. 12(C) shows the binary distance (i.e., closest distances in black) between textural feature vectors extracted from the training image and textural feature vectors of the reference pattern for 9 different affinity factor couples. The correlation between the visible affinity of the training image and the results are very good as the methodology detects an affinity ($a_x=2, a_y=1$) for most of the pixels in the lower part of the training image, an affinity ($a_x=0.5, a_y=1$) for most of the pixels in the middle left part of the training image, an affinity ($a_x=0.5, a_y=0.5$) for most of the pixels in the middle right part of the training image, and an affinity ($a_x=1, a_y=0.5$) for most of the pixels in the upper right corner of the training image. The algorithm also detects an affinity ($a_x=1, a_y=1$) at two locations on the training image: as expected, in the upper left corner of the training image that was also used as the reference pattern, and towards the lower part of the training image. This artifact at affinity ($a_x=1, a_y=1$) is due to edge discontinuity in the 2D image that is interpreted as a scale change.

Figure 13:
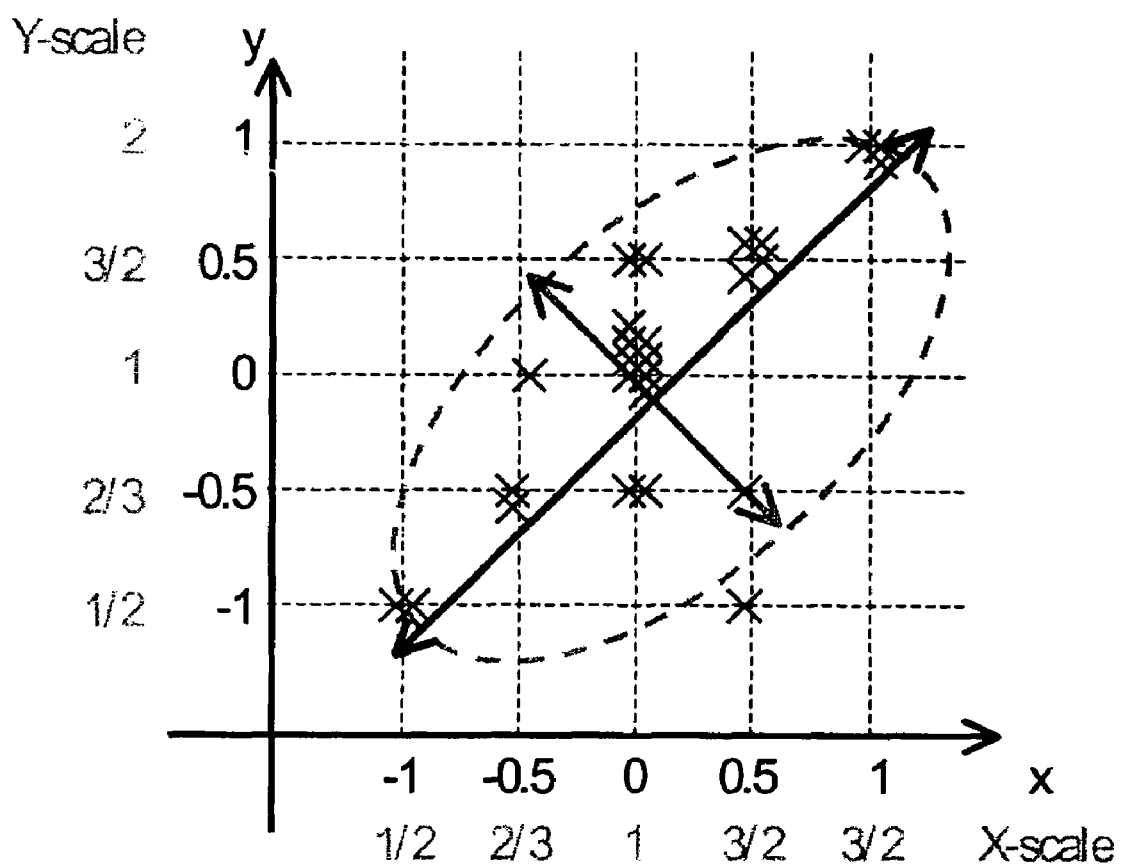
FIG. 13 is a graph that illustrates the measurement of a spread of points in a 2-dimensional space; this measurement is used to compute scale stationarity statistics and a score based thereon as part of the workflow of FIG. 1(B).

In the preferred embodiment, the operations of block 727 utilize the principles of the affinity maps as described above to generate scale stationarity statistics. Scale stationarity, relative to a reference pattern, can be measured by how many different scales (and aspect ratios) are covered by that image, or how the image spreads in a scale-space when an assumption is made that the image is derived from a repetition of a unique pattern at different scales and orientations. More particularly, scale stationarity can be defined as the departure from a single clustered value of (X×1, Y×1) on the affinity map; hence any variation along the X or Y axis of the affinity map indicates a non-stationary image. In the preferred embodiment, scale stationarity of the image is measured by calculating the spread of the cloud of points $p_1, p_2, \ldots p_n$ defined by the best matches between the image and the dilated patterns. The measure of the spread can then be simply computed as a measure of spread of points in a 2-dimensional space as shown in FIG. 13. These best-match points are located in a scale-space where the X-axis corresponds to the possible dilatation along the X-axis, and the Y-axis to the possible dilatations along the Y-axis. Each of those points, which can represent a different small zone on the image, describes by its location in that scale-space, the x and y dilation factors. The scale-space is not continuous but discrete, since only a small number of dilations of the reference pattern are computed. The dilation factors are mapped into the scale-space through a bijection (i.e., a one-to-one mapping). In the preferred embodiment, the x-dilation factors are ½, ⅔, 1, 3/2 and 2 and correspond to abscises of −1, −½, 0, ½ and 1. Such a scale space is represented in FIG. 13. In this example, the scale-space representation of the spread of a cloud of points is symbolized by an ellipse. The first and second principal component directions are shown. The two principal components of the points $p_1, p_2, \ldots p_n$ are obtained by the singular value decomposition $$(SVD)\begin{bmatrix} x_i \\ y_i \end{bmatrix}_{i \in [1,n]} = U \times S \times V^T.$$

The first principal component gives the direction of the strongest variation of the points and the second principal component is orthogonal to the first one and gives the directions of the weakest variation of the points. The ratio $s_2/s_1$ of the two singular values $s_1$ and $s_2$ (which can be retrieved from the diagonal of the matrix S) gives, the importance of variation of the points $p_1, p_2, \ldots p_n$ along the direction of the second principal direction. Let $u=(u_x, u_y)$ be the unitary vector defining the direction of the first principal component and let $v=(v_x, v_y)$ be the unitary vector defining the direction of the second principal component (u and v are orthogonal). The unitary vectors u and v can be obtained by normalizing the first and second column of the matrix V. The coordinates of $p_1$, $p_2, \ldots p_n$ in the u, v coordinates system can be obtained from $$\begin{bmatrix} u_i \\ v_i \end{bmatrix}_{i \in [1,n]} = U \times \begin{bmatrix} x_i \\ y_i \end{bmatrix}_{i \in [1,n]}.$$

The "spread" of the cloud of points is defined as depending both on the variance along the first principal direction and the effect of the variance along the second, orthogonal, principal direction. The variability along the first principal direction is computed as follows:

$$stdev(u_i)_{i \in [1,n]} = \sqrt{\frac{1}{n-1} \sum_{j=1}^{n} (u_j - \bar{u})^2}, \text{ where } \bar{u} = \frac{1}{n} \sum_{i=1}^{n} u_i.$$

The total spread of the cloud of points $p_1, p_2, \ldots p_n$ is defined as follows:

$$\text{spread} = \min\{1, stdev(u_i)_{i \in [1,n]} \times (1 + s_2/s_1)\}.$$

This formula has been conceived in order to give a stronger spread when the cloud of points has an elliptical or circular shape than when the spread is only with a constant Y/X ratio. Moreover, it is also constrained between the values of 0 (all the points are concentrated in the middle point (0, 0), i.e. all the scales are x1, x1) and 1. The scale stationarity score is simply 1−spread (i.e., scale_stationarity =1−spread) and is expressed as a percentage. In the preferred embodiment, a fully automated scale stationarity score computation is employed in block 727 that calculates the minimum value of 9 scale stationarity scores computed with reference patterns located at the top right, top middle, top left, middle right, center, middle left, bottom right, bottom middle and bottom left parts of the training, which is similar to the computation of the orientation stationarity score as described above. These operations can be represented $$\text{mathematically as scale\_stationary} = \min_{k=1}^{9} (\text{scale\_stationary}_k).$$

The operations of block 111C (FIG. 1(B)) that characterize the category distribution stationarity of the training image of block 109 verify that the distribution of categories does not change considerably from one region of the image to the other. In the preferred embodiment, the training image is subdivided into zones in a manner similar to that described above with respect to FIGS. 6(A)-6(I) in generating the orientation stationarity statistics. A category distribution histogram $H_k$ is computed on each zone k out of the 9 zones of the preferred embodiment. The category distribution histograms all contain G bins, where G is the number of categories. The similarity of two gray scale histograms $H_k$ and $H_l$ is measured using the Euclidian distance between vectors $H_k$ and $H_l$:

$$\sum_{c=1}^{G} [H_k(c) - H_l(c)]^2.$$

The category distribution stationarity score for all the zones is computed as follows:

$$\text{colorclass\_stationary} = 1 - \min\left(1, \max_{k,l}\left(\sqrt{\sum_{c=1}^{G} [H_k(c) - H_l(c)]^2}\right)\right).$$

Figure 14:
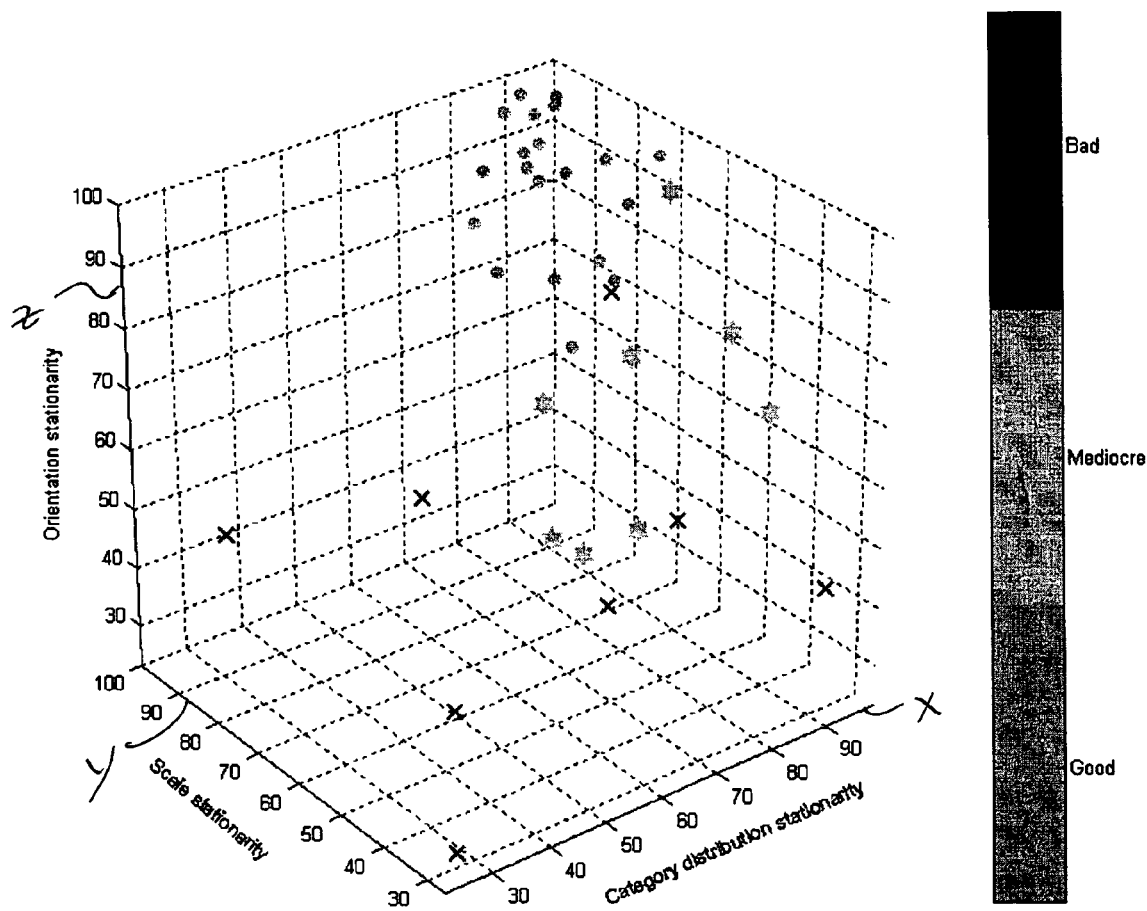
FIG. 14 is a diagram illustrating a three-dimensional plot of the stationarity scores for a number of training images; the axes correspond to three different stationarity measures with the X-axis corresponding to the category distribution stationarity measure, the Y-axis corresponding to the scale stationarity measure, and the Z-axis corresponding to the orientation stationarity measure; regions of this 3-D space can be defined as delimiting "good" training images and used as a decision criterion to automatically ascertain whether the particular training image is sufficiently stationary for use in multiple-point geostatistical analysis requiring such stationarity.

In block 113, the stationarity scores generated in block 111 are analyzed to determine if the training image satisfies a set of predetermined constraints which dictate whether or not the training image should be used in subsequent multi-point geostatistical analysis. In the preferred embodiment, the orientation stationarity score (111A), the scale stationarity score (block 111B), and the category distribution stationarity score (111C) are plotted on a three dimensional graph whose axes correspond to the three scores as illustrated in FIG. 14. A set of surfaces are defined that represent one or more regions in the three-dimensional space delimiting "good" training images. If the three scores for the particular training image fall within the one or more regions delimiting "good" training images, the stationarity criterion of block 113 is satisfied; otherwise, the stationarity criterion of block 113 fails.

In the event that the stationarity criterion of block 113 is satisfied, the training image can be exported as an image grid for multipoint geostatistical analysis (block 119). Examples of such multipoint geostatistical analysis include a computer-based implementation of the SNESIM algorithm and/or a computer-based implementation of the SIMPAT algorithm.

Figure 15:
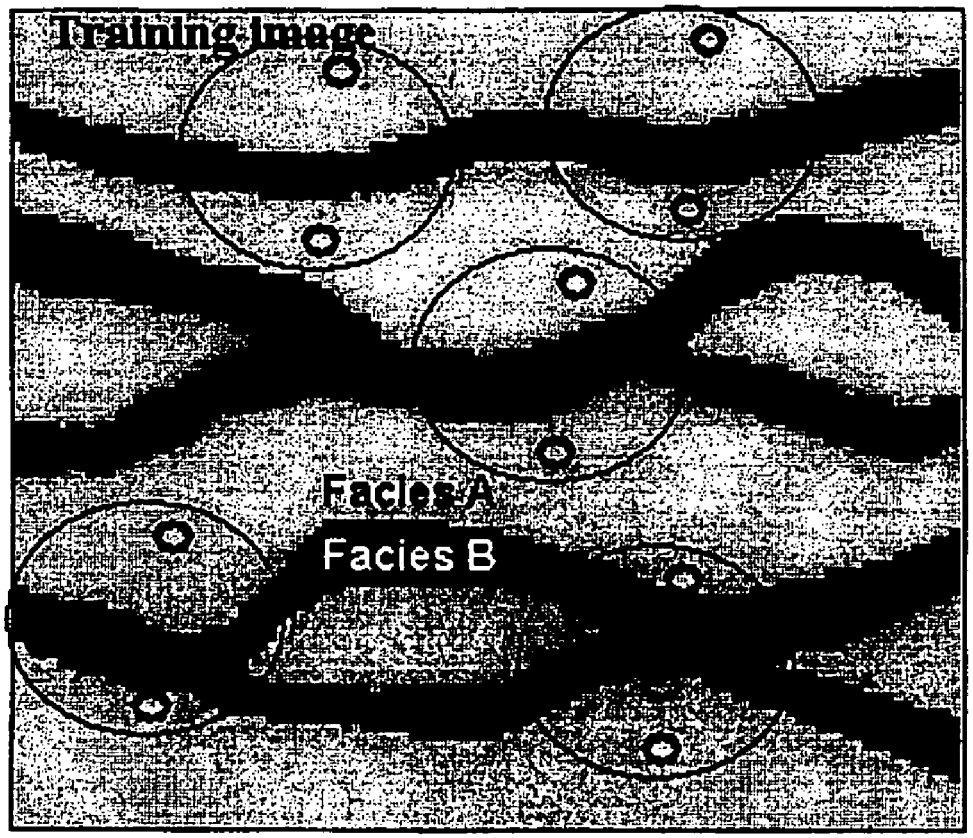
FIG. 15 is a schematic diagram illustrating the SNESIM method of geostatistical analysis and simulation.
Figure 15:
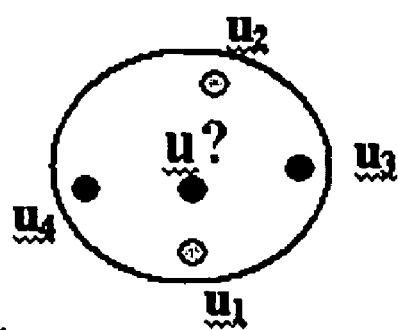

In the SNESIM (Single Normal Equation SIMulator) method, the conditional probability density function of all categories at one point is computed utilizing knowledge of the value at a small number of nearby points and statistics provided by a "training image". SNESIM works with discrete values only (i.e. a finite and usually small number of categories, such as for example five different rock types). Assume there are two categories to be simulated: A (intra-channel) and B (channel). The training image contains a complete representation (i.e. an example) of a spatial distribution of A and B. Assume further that the category present at 4 points $(u_1, u_2, u_3, u_4)$, which could represent wells, is known. Conceptually, the SNESIM method computes the probability of finding categories A or B at a fifth point $(u_?)$ by consulting the training image for all occurrences of the "pattern" $(u_1, u_2, u_3, u_4)$ (that is all occurrences of 4 points with the same relative locations to one another and the same categories values in the training image) as shown in FIG. 15. If 5 such occurrences (these are called replicates) are found, and 4 out of 5 replicates show categories B at the relative position of the unknown point $(u_?)$, then the method concludes that the probability of B at the unknown point is 80% (while that of A is 20%). Furthermore, the method can assign a category to the unknown point by randomly drawing a value from a distribution with 80% probability of B and 20% probability of A. In practice, the SNESIM method starts with a blank volume to be modeled, or one that contains only a few data points to be honored, and first decides on a random path for visiting each of the blank pixels once and only once. In the first pixel, the method calls for searching for nearby known points within a search ellipsoid. If one or more known (or already assigned) pixels are found, it proceeds as described above to find the probability of finding categories A or B at the unknown point. Armed with the probabilities for each category at the unknown point, the method randomly draws a value (weighted by the known probabilities) and assigns it to the unknown point. The process repeats at the next pixel in the initially-assigned random path until all pixels are assigned.

Such methodology was well known in the early 1990's (before it was known as "SNESIM"). One of its problems, however, was that it was extremely computationally intensive to consult the training image multiple times. In 2000, a technique was discovered to store the information contained in the training image in a special tree-like structure that reduced computations enormously. With this improvement, the methodology was commonly referred to as the SNESIM method. Coupled with the steadily increasing power of digital computers, it brought the image-consultation problem down to reasonable (though still significant) processing times.

The core SNESIM methodology has several variations and additions that make be used to make it more powerful and useful. One improvement adds the ability to process in successive stages of increasing resolution, which improves lateral continuity of features. The number of refinements is called multiplicity. Another improvement provides the ability to use soft probabilities (possibly derived from seismic data) to further control the modeling. Through further additions, the SNESIM method can handle scale transformations by simply scaling the distances to the known points (($u_1$, $u_2$, $u_3$, $u_4$) in the example above) according to user-provided location-dependent scaling information. Similarly it can incorporate information on the rotation of geologic features (such as channel directions) by rotating the set of points according to the local value of a user-provided rotation field.

Figure 16A:
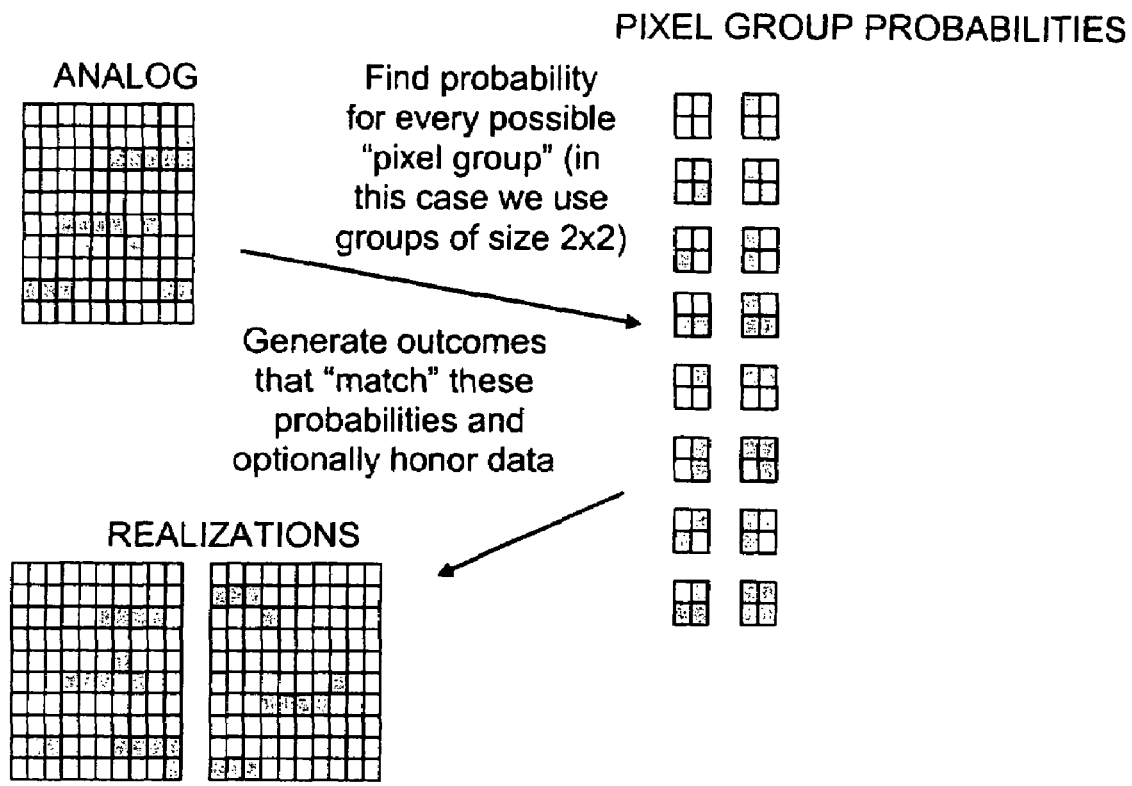
FIG. 16(A) is a schematic diagram illustrating the SIMPAT method of geostatistical analysis and simulation.

In the SIMPAT (SIMulation with PATterns) method, the probability of occurrence of all combinations of values within a small set of contiguous points (such as a rectangular matrix) are computed. Unlike the SNESIM method, the SIMPAT method can work with either discrete (category) values, or continuous numerical values. More particularly, the SIMPAT method estimates such probabilities in the training image by counting the occurrences of these patterns by means of a moving rectangular template that scans the entire image. For example, if applied to a binary 2-dimensional image with a template of 2×2 pixels, the method assigns a probability of occurrence to every possible outcome of the 2×2 pixel template (namely 24 or 16 possible outcomes). The result is a probability distribution whose domain consists of 24 pixel combinations as shown in FIG. 16(A). In practice, larger templates (of up to about 8×8 pixels) are used leading to a very large number of possible combinations, though many may have an occurrence or probability of zero, if they are absent in the training image. Simulation is achieved by drawing at random from the distribution to progressively fill an initially empty image. Care must be taken to honor pixels already filled, or pixels that represent hard conditioning data. This can be achieved by drawing from a subset of the original distribution of pixel groups, namely the subsets of those pixel groups that honor the preexisting data.

Figure 16B:
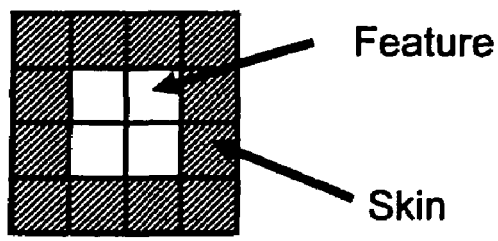
FIG. 16(B) is a schematic diagram illustrating an extension of the SIMPAT method which employs "feature-based" geostatistics.

The need to match preexisting points may lead to lengthy computation times with larger patterns, because many points need to be matched simultaneously along the borders of larger patterns. This has led to the use of a somewhat more refined method called "feature-based" geostatistics, which relies on a template that contains an inner "feature" and an outer "skin" as shown in FIG. 16(B). In practice, the feature is generally larger than 2×2 pixels, but the skin is typically one pixel wide. This partition facilitates template classification. By scanning the image, the method obtains a collection of features and their probabilities of occurrence. A given feature (2×2 pixels in this example) may occur several times, but each time with a different skin. Therefore, each feature has a probability, but many possible skins, each of which in turn has its probability (relative to the feature). When a feature needs to be assigned next to an existing one, it is drawn from all features with a matching skin, weighted by the probability of each possible skin in the existing feature. Thus the skin constrains the probability of occurrence of features in its immediate neighborhood, and allows for matching of neighboring features.

The SIMPAT method can be extended in ways that are somewhat similar to the extensions of the SNESIM method. Namely, by performing the simulation in stages ranging from a coarse grid (for example a grid that only uses every fifth pixel in every direction) to a finer grid, and using the results each previous (coarser) stage as values to be honored in the next (finer) stage, the SIMPAT method greatly improves its ability to honor continuity of long features (such as channels). Also, the patterns can be scaled and rotated to honor user-provided local scaling and rotation information. In general, the SIMPAT method achieves better results than the SNESIM method (in that it honors the statistics of the original training image more closely) but is also computationally slower.

In the event that the stationarity criterion of block 113 fails, the non-stationary training image can be exported as an image grid for multi-point geostatistical analysis (block 127A). Similarly, the orientation grid and affinity maps derived as part of the computation of the stationarity statistics herein can be exported as constraint grids for multipoint geostatistical analysis that accepts non-stationary training images.

The computer-based methodology described above can readily be extended to three-dimensional training images. More particularly, the workflow of FIG. 1B would be modified as follows. First, blocks 101-105 are adapted to store and retrieve 3D images. Second, block 107 is adapted to use 3D versions of the 2D image processing operations described above in order to preprocess 3D images and create valid 3D training images. Finally, block 111 is adapted to use 3D versions of the 2D operations described above for generating the stationarity statistics. More particularly, instead of subdividing the 2D training image into 9 overlapping rectangles (FIGS. 6(A)-6(I)), the 3D training image can be subdivided into 27 overlapping cubes. A 3D version of the operations that extract the orientation field of the training image is used. In this case, the first principal components of the 3D orientation vectors are perpendicular to gradient surfaces. These 3D orientation vectors are spherical data on which stationarity statistics are extracted. 3D versions of the operations described above for assessing the stationarity of the orientation field are described in Mardia, "Statistics of Directional Data," Academic Press; New York, 1972, and Rock, "Lecture Notes in Earth Sciences 18—Numerical Geology," Springer Verlag, 1988, incorporated by reference herein in their entireties. 3D versions of the operations described above for accessing scale stationarity would also be used. In such operations, the gray level co-occurrence matrices used therein require a spherical neighborhood system instead of a circular one. The scale stationarity statistics themselves would be done on 3D scale-space affinity maps using the 3D version of the SVD and standard deviation. The category stationarity statistics can be easily performed on category distributions from the 27 overlapping cubes of the 3D image (instead of 9 overlapping rectangles of the 2D image). The stationarity criteria of block 113 would be similarly applied to keep or discard 3D training images. Similarly, the training image grids, as well as the scale and orientation constraint grids, can be exported as 3D grids (instead of 2D grids).

The computer-based methodology of the present invention can also readily be extend to work with training images that have continuous values instead of a small number of categories. Therefore, the methodology is suitable for multipoint geostatical methods that accept training image grids containing property values (instead of categories).

The computer-based methodologies of the present invention have been tested on a library of thirty-eight training images and have been shown to accurately identify whether or not the stationarity of a candidate training image makes it suitable for MPGS realizations. By consequence, geologists save time and avoid running unnecessary MPGS realizations using unsuitable training images. Moreover, the computer-based methodologies of the present invention are computationally efficient, and typically can be executed on a conventional laptop computer in only a few seconds, whereas one needs to wait much longer for the results of one realization of MPGS algorithms. Finally, the stationarity statistics results output by the computer-based methodology of the present invention have been thoroughly verified, and have been found to be similar to the outcome of a human interpretation based on a visual inspection of training images.

There have been described and illustrated herein computer-based methodologies for automatically evaluating the stationarity of training images for use in multipoint geostatistical analysis. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A computer-implemented method comprising:
   using a computer to carry out the steps of:
   analyzing digital data representing an image to generate at least one statistic characterizing stationarity of the image;
   deriving at least one score based upon said at least one statistic;
   determining whether said at least one score satisfies a stationarity criterion; and
   upon determining that said at least one score satisfies said stationarity criterion, storing or outputting said image for use as a stationary training image grid in at least one multipoint geostatistical analysis.

2. A computer-implemented method according to claim 1, wherein:
   said at least one statistic comprises a plurality of statistics that characterize stationarity of an orientation field extracted from said image.

3. A computer-implemented method according to claim 2, wherein:
   said orientation field is computed by deriving a gradient field through 2D convolution on said image and then extracting a principal component of the gradient field over a sliding window of fixed size using principal component analysis.

4. A computer-implemented method according to claim 3, wherein:
   the 2D convolution employs Prewitt filters.

5. A computer-implemented method according to claim 2, wherein:
   the plurality of statistics that characterize stationarity of the orientation field include at least one of the following: (i) a first set of statistics that characterize nonuniformity of the orientation field and thus provide an indication that there is one or several preferential directions in the orientation grid, (ii) a second set of statistics that characterize the normality of the distribution of directions in the orientation grid and thus provides an indication that there is a dominant direction in the orientation field, and (iii) a third set of statistics that characterize the repeatability of the orientation field, which provides an indication that the orientation field is similar across different zones of the image.

6. A computer-implemented method according to claim 5, wherein:
   the plurality of statistics are computed over a plurality of overlapping zones in the image.

7. A computer-implemented method according to claim 5, further comprising:
   deriving a first score based upon the first set of statistics;
   deriving a second score based upon the second set of statistics;
   deriving a third score based upon the third set of statistics; and
   deriving a score that characterizes orientation stationarity of the image based upon the first, second and third scores.

8. A computer-implemented method according to claim 7, wherein:
   the score that characterizes orientation stationarity of the image is computed from a weighted average of the first, second and third scores.

9. A computer-implemented method according to claim 1, wherein:
   said at least one statistic comprises a plurality of statistics that characterize scale stationarity of said image.

10. A computer-implemented method according to claim 9, wherein:
    the plurality of statistics that characterize scale stationarity of the image comprise distances between a first set of feature vectors and a second set of feature vectors, the first set of feature vectors derived from a first set of displacement images that are generated by subjecting the image to a plurality of rotation-dependent sampling operations, and the second set of feature vectors derived from a second set of displacement images that are generated by subjecting a reference pattern selected from the image to a plurality of rotation-and-scale-dependent sampling operations.

11. A computer-implemented method according to claim 10, wherein:
    the plurality of rotation-dependent sampling operations employ circular neighborhood sampling with orientation transformations; and
    the plurality of rotation-and-scale-dependent sampling operations employ circular neighborhood sampling with both scale and orientation transformations.

12. A computer-implemented method according to claim 11, wherein:
    the orientation transformations are performed over a predetermined number of affinity factor pairs.

13. A computer-implemented method according to claim 10, wherein:
    the first set of feature vectors are computed by calculating gray level co-occurrence matrices over the first set of displacement images; and the second set of feature vectors are computed by calculating gray level co-occurrence matrices over the second set of displacement images.

14. A computer-implemented method according to claim 10, further comprising:
generating an affinity map that characterizes the distances between the first set of feature vectors and the second set of feature vectors over the training image.

15. A computer-implemented method according to claim 14, wherein:
the affinity map identifies regions of the image and a particular affinity factor couple associated with each given region, the particular affinity factor coupled identify by minimizing distance between the feature vectors of the first set pertaining to the given region and the feature vectors of the second set pertaining to different affinity factor couples.

16. A computer-implemented method according to claim 14, wherein:
the affinity map includes sub-maps each corresponding to a different affinity factor couple, wherein a given sub-map characterizes distances between the feature vectors of the first set and the feature vectors of the second set pertaining to the particular affinity factor couple of the given sub-map.

17. A computer-implemented method according to claim 16, wherein:
each sub-map comprises a plurality of gray scale pixels.

18. A computer-implemented method according to claim 16, wherein:
each sub-map comprises a plurality of binary pixels.

19. A computer-implemented method according to claim 14, further comprising:
displaying the affinity map.

20. A computer-implemented method according to claim 1, wherein:
said at least one statistic comprises a plurality of statistics that characterize category distribution stationarity of said image.

21. A computer-implemented method according to claim 1, further comprising:
upon determining that said at least one score does not satisfy said stationarity criterion, storing or outputting said image for use as a non-stationary training image grid in at least one multipoint geostatistical analysis.

22. A computer-implemented method according to claim 2, further comprising:
storing or outputting said orientation field for use in at least one multipoint geostatistical analysis.

23. A computer-implemented method according to claim 14, further comprising:
storing or outputting said affinity map for use in at least one multipoint geostatistical analysis.

24. A computer-implemented method according to claim 1, further comprising:
applying image processing operations on a candidate image to generate an image suitable for the analysis that generates at least one statistic characterizing stationarity of the image, said image processing operations reducing the number of grayscale/color levels of the candidate image while keeping geological significance of the assigned categories of the candidate image.

* * * * *

UNITED STATES PATENT AND TRADEMARK OFFICE
CERTIFICATE OF CORRECTION

PATENT NO. : 7,630,517 B2  Page 1 of 1
APPLICATION NO. : 11/180191
DATED : December 8, 2009
INVENTOR(S) : Mirowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1057 days.

Signed and Sealed this

Twenty-first Day of December, 2010

David J. Kappos
*Director of the United States Patent and Trademark Office*